(12) United States Patent
Ashton et al.

(10) Patent No.: US 11,897,768 B2
(45) Date of Patent: Feb. 13, 2024

(54) SYSTEMS AND METHODS FOR LOCAL GENERATION AND/OR CONSUMPTION OF HYDROGEN GAS

(71) Applicant: Modern Hydrogen, Inc., Bothell, WA (US)

(72) Inventors: Justin B. Ashton, Palo Alto, CA (US); Roelof E. Groenewald, Bothell, WA (US); Kevin J. Hughes, Knoxville, TN (US); Arvind Kannan, Kirkland, WA (US); William Kokonaski, Edmonds, WA (US); Max N. Mankin, Seattle, WA (US); Tony S. Pan, Bothell, WA (US); Lowell L Wood, Bellevue, WA (US); John J. Lorr, Redmond, WA (US); Amit Goyal, Hoover, AL (US); Guido Radaelli, Pleasant Hill, CA (US); Vikram Seshadri, Redmond, WA (US)

(73) Assignee: Modern Hydrogen, Inc., Bothell, WA (US)

( * ) Notice: Subject to any disclaimer, the term of this patent is extended or adjusted under 35 U.S.C. 154(b) by 0 days.

(21) Appl. No.: 17/337,326

(22) Filed: Jun. 2, 2021

(65) Prior Publication Data
US 2021/0380407 A1    Dec. 9, 2021

Related U.S. Application Data

(60) Provisional application No. 63/113,931, filed on Nov. 15, 2020, provisional application No. 63/034,385, filed on Jun. 3, 2020.

(51) Int. Cl.
C01B 3/24    (2006.01)
B01J 19/00   (2006.01)
(Continued)

(52) U.S. Cl.
CPC ............. *C01B 3/24* (2013.01); *B01J 6/008* (2013.01); *B01J 19/0013* (2013.01);
(Continued)

(58) Field of Classification Search
CPC ..... B01J 6/00; B01J 6/008; B01J 19/00; B01J 19/006; B01J 19/0013; B01J 19/24;
(Continued)

(56) References Cited

U.S. PATENT DOCUMENTS 3,460,524 A  *  8/1969  Lazaridis ................ H01J 45/00
                                                      126/110 E
4,797,091 A  *  1/1989  Neumann ............... C10B 47/30
                                                      110/220

(Continued)

FOREIGN PATENT DOCUMENTS

WO    WO-9958614      11/1999
WO    WO-2010127961   11/2010
(Continued)

OTHER PUBLICATIONS

International Search Report and Written Opinion for International Patent Application No. PCT/US21/35541, Applicant: Modern Electron, Inc., dated Sep. 17, 2021, 13 pages.

*Primary Examiner* — Natasha E Young
(74) *Attorney, Agent, or Firm* — Perkins Coie LLP

(57) ABSTRACT

Systems for producing hydrogen gas for local distribution, consumption, and/or storage, and related devices and methods are disclosed herein. A representative system includes a pyrolysis reactor that can be coupled to a supply of reaction material that includes a hydrocarbon. The reactor includes one or more flow channels positioned to transfer heat to the reaction material to convert the hydrocarbon into an output that includes hydrogen gas and carbon particulates. The system also includes a carbon separation system operably
(Continued)

coupled to the pyrolysis reactor to separate the hydrogen gas the carbon particulates in the output. In various embodiments, the system also includes components to locally consume the filtered hydrogen gas.

28 Claims, 19 Drawing Sheets

(51) Int. Cl.
 *B01J 19/24* (2006.01)
 *B01J 6/00* (2006.01)
(52) U.S. Cl.
 CPC .. *B01J 19/2425* (2013.01); *B01J 2219/00065* (2013.01); *B01J 2219/00157* (2013.01); *C01B 2203/0272* (2013.01); *C01B 2203/1235* (2013.01)
(58) Field of Classification Search
 CPC .......................... B01J 19/2415; B01J 19/2425; B01J 2219/00; B01J 2219/00049; B01J 2219/00051; B01J 2219/00054; B01J 2219/00056; B01J 2219/00065; B01J 2219/00157; C01B 3/00; C01B 3/02; C01B 3/22; C01B 3/24; C01B 2203/00; C01B 2203/02; C01B 2203/0266; C01B 2203/0272; C01B 2203/04; C01B 2203/0465; C01B 2203/049; C01B 2203/06; C01B 2203/066; C01B 2203/08; C01B 2203/0805; C01B 2203/0811; C01B 2203/0822; C01B 2203/0833; C01B 2203/12; C01B 2203/1205; C01B 2203/1211; C01B 2203/1235; C01B 2203/14; C01B 2203/142; C01B 2203/14316; C01B 2203/1614; C01B 2203/1628; C01B 2203/80; C01B 2203/84; Y02P 20/00; Y02P 20/10; Y02P 20/129
 See application file for complete search history.

(56) References Cited

U.S. PATENT DOCUMENTS

| | | | |
|---|---|---|---|
| 7,537,623 | B2 | 5/2009 | Etievant et al. |
| 9,406,957 | B2* | 8/2016 | Jackson .............. H01M 8/0612 |
| 2002/0007594 | A1 | 1/2002 | Muradov |
| 2010/0035103 | A1 | 2/2010 | Jackson |
| 2010/0175639 | A1 | 7/2010 | Al-Dawood et al. |
| 2013/0213256 | A1 | 8/2013 | McAlister |
| 2020/0294779 | A1 | 9/2020 | Ashton et al. |
| 2022/0315424 | A1* | 10/2022 | Ashton ................... C01B 3/363 |
| 2022/0387952 | A1 | 12/2022 | Groenewald et al. |

FOREIGN PATENT DOCUMENTS

| | | |
|---|---|---|
| WO | WO-2019226416 | 11/2019 |
| WO | WO-2021102521 | 6/2021 |
| WO | WO-2021247768 | 12/2021 |

* cited by examiner

| | | RESIDENTIAL | | COMMERCIAL | DISTRICT | | DATA-CENTERS |
|---|---|---|---|---|---|---|---|
| | User Case | Single Unit | Apt'mt Complex | Industrial/Office/Campus/Airport/Hospital/Mall | Co-Gen | Tri-Gen | Datacenter |
| Power | Design Capacity | 10,000 kWh/y | 250,000 kWh/y | 12 kWh/sqft/year | 40,000,000 kWh/y | 10 MW | 25 MW |
| | Demand Curve | Discontinuous | Discontinuous | Daily Cycle | Continuous | | Continuous |
| Heating | Design Capacity | 100,000 Btu/h | 2.5 MMBtu/h | 25 Btu/h/sqft | 10,000kW | 10 MW | -- |
| | Demand Curve | Seasonal | Seasonal | Seasonal | Seasonal | Seasonal | -- |
| Cooling | Design Capacity | 2000 kWh/Y | 50,000 kWH/y | N/A | 3kWh/sqft/y | 10 MW | 25 MW |
| | Demand Curve | Seasonal | Seasonal | N/A | Seasonal | Seasonal | Continuous |
| Natural gas requirements | Autothermal, TMD only | 140 MMBtu/y | 5,250 MMBtu/y | 70,000 MMBtu/y | N/A | N/A | N/A |
| | RTP, TMD only | 145 MMBtu/y | 4,875 MMBtu/y | 9,500 MMBtu/y | N/A | N/A | N/A |
| | Autothermal, TMD and Cogen | 168 MMBtu/y | 6,300 MMBtu/y | 136,189 MMBtu/y | 453,963 MMBtu/y | 907,925 MMBtu/y | 2,468,421 MMBtu/y |
| | RTP, TMD and Cogen | 164 MMBtu/y | 5,350 MMBtu/y | 18,483 MMBtu/y | 616,092 MMBtu/y | 1,232,184 MMBtu/y | 3,350,000 MMBtu/y |

TMD: Thermal Methane Decomposition
Btu/h: British thermal units per hour
MMBtu/y: Million British thermal units per year
kWh/sqft/year: Kilowatt hour per square foot per year
kWh/year: Kilowatt hour per year
MW: Megawatt
Cogen: Heating, Cooling, and/or Power Generation
N/A: Not Available

*FIG. 23*

SYSTEMS AND METHODS FOR LOCAL GENERATION AND/OR CONSUMPTION OF HYDROGEN GAS

CROSS-REFERENCE TO RELATED APPLICATIONS

This application claims priority to U.S. Provisional Patent Application No. 63/034,385, filed on Jun. 3, 2020, and U.S. Provisional Patent Application No. 63/113,931, filed on Nov. 15, 2020, the entireties of which are incorporated herein by reference.

TECHNICAL FIELD

The present technology is generally related to systems for locally generating and hydrogen gas from hydrocarbon fuels. In particular, the present technology relates to small-scale (e.g., residential scale) pyrolysis reactor systems for generating, and consuming hydrogen gas from natural gas and methane.

BACKGROUND

Hydrogen is typically generated by large scale reactors operating at high temperatures in an industrial setting. The hydrogen produced is then transported for eventual use in fuel cells and/or other industrial processes, such as producing certain ammonia-based fertilizers and/or other applications. Recently, the use of hydrogen gas as a thermal energy source for heating and electricity has garnered interest as an attractive steppingstone between current fossil-fuel-based power generation and fully renewable energy systems, because combusting hydrogen gas does not release any greenhouse gases or other harmful chemicals. However, combusting hydrogen gas releases less heat than natural gas on a per mol basis, therefore requiring efficient systems for production.

Some methods for producing hydrogen include steam methane reforming (SMR), gasification, plasma-driven dissociation, thermal dissociation, and pyrolysis of gases such as methane with the use of catalytic molten metals or salts. Recent advances in catalytic methane pyrolysis have led to the development of novel combinations of molten metals and salts which enable high conversion rates of methane (more than 50%) at moderate temperatures (less than 1100° C.) using bubble column reactors in which conversion takes place at the heterogenous interface between the molten column fluid and rising bubbles of methane. These systems are promising developments towards enabling hydrogen production without the concurrent release of greenhouse gases, since carbon is naturally sequestered in solid form during the pyrolysis reaction. To date, these methods have only been applied in industrial scale applications, which typically involves continuously operated, large reactors for industrial hydrogen production at lower cost and/or lower carbon footprint than previous SMR processes.

BRIEF DESCRIPTION OF THE DRAWINGS

FIG. 23 is a table illustrating the power, heating, cooling, and natural gas demand and usage for various representative applications in accordance with some embodiments of the present technology.

Figure 1:
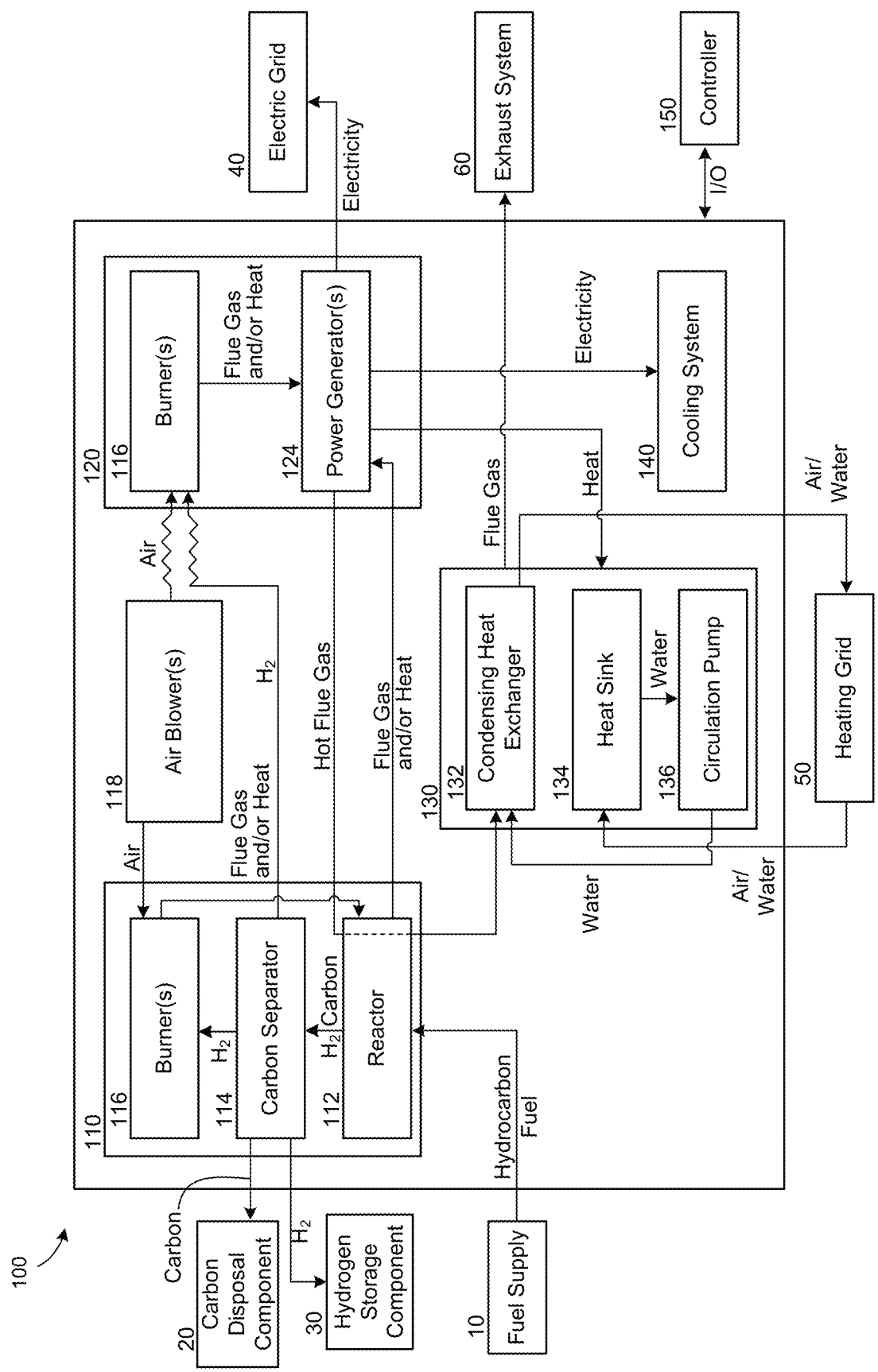
FIG. 1 is a block diagram of a system for producing hydrogen gas for local distribution, consumption, and/or storage in accordance with some embodiments of the present technology.

The Figures have not necessarily been drawn to scale. Similarly, some components and/or operations can be separated into different blocks or combined into a single block for the purpose of discussion of some implementations of the present technology. Moreover, while the technology is amenable to various modifications and alternative forms, specific implementations have been shown by way of example in the drawings and are described in detail below.

The intention, however, is not to limit the technology to the particular implementations described.

DETAILED DESCRIPTION

Overview

To enable the use of hydrogen that has been generated by an industrial reactor for residential and commercial building uses would require the replacement of all existing natural gas pipelines with hydrogen-compatible materials. This wholesale replacement of gas pipelines may be prohibitively expensive for widespread adoption. However, residential heating using fossil fuels is one of the largest contributors to global greenhouse gas emissions. Accordingly, a switch to hydrogen combustion in residential heating appliances would provide enormous environmental benefits. Hydrogen can also be converted directly to electricity using fuel cells or other devices, or indirectly via heat-to-electricity converters and heat engines at the building level. The use of hydrogen to generate electricity locally (e.g., in the same building, within the same neighborhood, within a single appliance and/or housing, within a space previously designated for a traditional appliance, and/or for local combined heat and power generation), could further reduce reliance on carbon-emitting power sources, thereby delivering further environmental benefits.

Systems for producing hydrogen gas for local distribution, consumption, and/or storage, and related devices and methods are disclosed herein. In some embodiments, a representative system includes an input line connectable to a supply of reaction material that includes a hydrocarbon, and a reactor in fluid communication with the input line. The reactor includes one or more flow channels positioned to transfer heat to the reaction material to convert the hydrocarbon into an output (e.g., an output product stream) that includes hydrogen gas, carbon particulates, and heat (as well as other gasses, such as leftover reaction material). The system also includes a carbon separation system operably coupled to the reactor to separate the hydrogen gas the carbon particulates in the output. In various embodiments, the system also includes components to locally consume the filtered hydrogen gas. For example, the system can include one or more burners that burn the hydrogen gas and one or more thermal pathways coupled between the burners and the reactor that transfer heat from the burners to the reactor. To transfer heat, in one example, the thermal pathways can direct hot flue gas from the burners over and/or through the reactor.

The system can also include one or more power generators operably coupled to the reactor and/or the burners. The power generators receive hydrogen and/or heat to generate electricity. The electricity can be used to power various components of the system and/or be directed into an electric grid. In turn, the electric grid can power a single-family residence, a multifamily residence, a commercial building, and/or any other suitable space. In some embodiments, more electricity is produced than consumed for near point use (e.g., at the building level). In some such embodiments, the excess electricity is exported to an external electrical power grid. In some such embodiments, the excess electricity is stored in a secondary fuel cell for later consumption at the building scale. The overall system can also include a circulation system operably coupled to the reactor, the burners, and/or the power generators via thermal pathways. The circulation system receives excess heat from other components in the system and circulates the heat in a heating grid and/or hot water grid for a single-family residence, a multifamily residence, a commercial building, and/or any other suitable space.

As disclosed herein, the system is scaled down to residential, neighborhood, or single commercial building levels to generate hydrogen near the point of use, thereby avoiding the need for infrastructure overhauls to enable a hydrogen or mixed hydrogen/natural gas grid. That is, the disclosed system designs enable partial or complete decarbonization of residential heating and/or electricity demands without any changes to the natural gas grid, since hydrogen is generated from natural gas in situ and also consumed in situ. However, pyrolysis reactors at a small scale also raises numerous challenges. To meet those challenges, various embodiments disclosed herein include features that adapt the pyrolysis reactors for small-scale applications and/or applying integration with residential heating systems.

For ease of reference, the systems and components therein are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the system and components therein can be moved to, and used in, different spatial orientations without changing the structure and/or function of the disclosed embodiments of the present technology.

Further, although primarily discussed herein as a system for breaking natural gas down into hydrogen gas for local consumption, one of skill in the art will understand that the scope of the present technology is not so limited. For example, the pyrolysis reactors described herein can also be used to break down any other suitable hydrocarbons. Accordingly, the scope of the present technology is not confined to any particular subset of embodiments.

DESCRIPTION OF THE FIGURES

FIG. 1 is a block diagram of a system 100 that can produce and/or utilize (e.g., distribute, consume, and/or store) hydrogen gas at a localized scale in accordance with some embodiments of the present technology. In some embodiments, producing and utilizing the hydrogen gas in the system 100 occurs within a single residential home. For example, the system 100 can be implemented as a single appliance positioned in a space previously occupied by conventional natural gas furnaces or burners and/or can act as a direct replacement for these conventional appliances. In another example, the system 100 can take the term of multiple devices and/or appliances operably connected to each other. Further, in some embodiments, the system 100 produces and utilizes the hydrogen gas at other localized scales. For example, as discussed in more detail below, the system 100 can produce and utilize the hydrogen gas for a single room, a single residential home, a multifamily home, an apartment building, a residential neighborhood, a public building (e.g., a single store, government building, hospital, school, or any other suitable space), a commercial building (e.g., an office building), a datacenter, or any other suitable space. Because the system 100 produces and utilizes hydrogen gas locally, the system 100 can be implemented to replace and/or supplement existing uses of hydrocarbon fuels (e.g., natural gas, methane, and other hydrocarbons), as well as replace and/or supplement existing sources of electricity, without any overhaul in infrastructure.

In the illustrated embodiment, the overall system 100 includes a reactor system 110, one or more air blowers 118, an electric generation system 120, a circulation system 130, and a cooling system 140 separate from the circulation system 130. The reactor system 110 includes a reactor 112 operably coupled to a fuel supply 10 and a carbon separator 114 operably coupled to the reactor 112. The reactant from the fuel supply includes a hydrocarbon that can be decomposed by the reactor system 110. Examples of suitable reactants include natural gas or methane, gasoline, jet fuel, propane, kerosene, diesel, and/or any other suitable hydrocarbon fuel. As discussed in more detail below, the reactor 112 receives the reactant and decomposes the hydrocarbon into hydrogen gas and carbon particulates, which are then sent to the carbon separator 114. The carbon separator 114 removes the carbon particulates from the hydrogen gas, thereby producing hydrogen fuel. The carbon separator 114 can then collect and direct the carbon particulates to a carbon disposal component 20 (e.g., an emptiable bin, allowing the carbon to be disposed of or resold), while the hydrogen gas can be utilized within the reactor system 110 and/or elsewhere in the overall system 100. For example, in the illustrated embodiment, the reactor system 110 also includes one or more burner(s) 116 operably coupled to one or more air blowers 118 to combust the hydrogen gas. A thermal pathway between the burner(s) 116 and the reactor 112 can communicate the heat generated by combusting the hydrogen gas. For example, the thermal pathway can direct the hot flue gas around and/or through the reactor 112. The reactor 112 receives the heat from the combusting hydrogen gas and uses the heat to decompose further hydrocarbons.

Additionally, or alternatively, the reactor system 110 can direct the hydrogen gas to the electric generation system 120 (where it is consumed) and/or a hydrogen storage component 30 for distribution and/or later consumption. For example, the hydrogen storage component 30 can be drawn on for combustion fuel to reheat the reactor 112 after periods of non-use. For a reactor 112 that contains about 10 kilograms (kg) KCl, the amount of energy to heat the reactor 112 from room temperature to an operating temperature of about 1000° C. is roughly 11,000 kilojoules (kJ). This energy can be generated by combusting about 860 standard liters of hydrogen gas, assuming relatively complete utilization of the heat. In another example, hydrogen storage can be used to decouple generating the hydrogen from consuming the hydrogen. That is, the stored hydrogen can supplement and/or replace the stream of produced hydrogen during periods of high demand. In another example, stored hydrogen can also be redistributed into a hydrogen grid. The hydrogen grid can be used to charge fuel cells (e.g., fuel cells used later by the system 100, used in automobiles, and/or any other suitable fuel cell), and/or redistribute hydrogen to neighboring apartments, homes, and/or buildings with higher energy demand with minimal additions in infrastructure.

Non-limiting examples of the materials that can be used to store hydrogen include typical gas storage tanks and solid materials such as zeolite, Pd, H3N:BH3, and/or any of the solid materials set out in Table 1 below.

TABLE 1

| Material | $P_{abs}$, $T_{abs}$ | Storage capacity (wt. %) | Vol. needed to hold 2300 standard liters of $H_2$ (L) |
| --- | --- | --- | --- |
| 60 wt % Mg—Ni | 2 bar, 250 C. | 4 | 1.95 |
| $MgH_2$ - 5 wt % V | 2 bar, 300 C. | 5 | 2.2 |

TABLE 1-continued

| Material | $P_{abs}$, $T_{abs}$ | Storage capacity (wt. %) | Vol. needed to hold 2300 standard liters of $H_2$ (L) |
| --- | --- | --- | --- |
| $MgH_2$ - 0.2 mol % $Cr_2O_3$ | 2 bar, 300 C. | 5 | 1.431 |
| $MgH_2$ - 37 wt % benzene | 0.66 bar, 180 C. | ~1 wt % in 0.5 hr | 15.7 |
| ZrMnNi | ~2 bar, 30 C. | ~0.3 wt % | 9.1 |
| La0.27Mg0.23Ni3.5 | 1 bar, 25 C. | ~1 wt % | 2.6 |
| $TiMn_{1.5}$ | 7 bar, 30 C. | 1.86 | 1.79 |
| $Li_3N$ | 1 bar, 255 C. | 10 wt % | 3.7 |

As further illustrated in FIG. 1, the electric generation system 120 also includes one or more burners 116 operably coupled to the air blower(s) 118 to burn the hydrogen gas, and one or more power generators 124 operably coupled to the burner(s) 116 and/or the output from the reactor 112 (e.g., hot gasses, hydrogen gas, and/or heat through a physical transfer medium such as a heat transfer fluid). The power generator(s) 124 use the flue gas the burner(s) 116, the heat from the burner(s) 116, and/or the output from the reactor 112 to generate electricity. In various embodiments, the power generator(s) 124 can include a thermionic converter, a thermophotovoltaic system, an alkali metal thermal energy converter (AMTEC), a fuel cell, an internal combustion engine, a turbine or microturbines, a thermoelectric generator, a steam turbine, and/or a Stirling engine. The electric generation system 120 can then direct the generated electricity into an electric grid 40 for local consumption, local storage, and/or distribution. For example, the electric grid 40 can include a secondary cell that stores a portion of the generated electricity and various electronic appliances in a residential home that consume a portion of the generated electricity. As described above, in some embodiments, more electricity is produced than is consumed in near point use (e.g., locally). In some such embodiments, the excess electricity is exported to the electric grid 40 and/or stored in secondary fuels for later consumption.

As further illustrated in FIG. 1, the electric generation system 120 can direct the excess hot flue gas and/or heat to the reactor system 110 and/or the circulation system 130. The reactor system 110 can use the non-converted heat and flue gas to help heat the reactor to decompose further hydrocarbons into the hydrogen gas. The reactor system 110 can then direct excess and/or parasitically lost heat to the circulation system 130 (e.g., through the flow of hot gasses and/or hot fluids, and/or through a physical transfer medium such as a heat transfer fluid or other suitable heat transfer medium).

In the illustrated embodiment, the circulation system 130 includes a condensing heat exchanger 132 operably coupled to the reactor system 110, a heat sink 134 operably coupled to the electric generation system 120, and a circulation pump 136 operably coupled to the condensing heat exchanger 132 and the heat sink 134. The condensing heat exchanger 132 receives the excess and/or parasitically lost heat from the reactor system 110. The condensing heat exchanger 132 then recycles the heat (e.g., in a boiler, furnace, and/or a similar appliance) to circulate heat into a heating grid 50. For example, the condensing heat exchanger 132 can use the excess heat from the reactor 112 to supply hot water for an apartment building. The heat sink 134 receives the excess and/or parasitically lost heat from the electric generation system 120. The circulation pump 136 then circulates a fluid (e.g., water, air, or another suitable heat transfer fluid) over the heat sink 144 and the condensing heat exchanger 132 to communicate heat from the heat sink 144 to the condensing heat exchanger 132 for additional recycling into the heating grid 50.

As further illustrated in FIG. 1, after the components of the system 100 have extracted heat from the flue gas for various uses, the system 100 can direct the flue gas to an exhaust system 60. In some embodiments, the system 100 replaces the hydrocarbons in the reactant entirely with the hydrogen gas product from the reactor system 110. Accordingly, in these embodiments, the flue gas includes only water vapor, oxygen gas, and/or any other molecules present in the air from the air blower(s) 118 (e.g., nitrogen gas). That is, the flue gas does not include new carbon dioxide molecules that would ordinarily result from burning the hydrocarbons. In some embodiments, the exhaust system 60 utilizes the existing ventilation systems in the space that the system 100 is implemented in (e.g., an existing ventilation system to direct carbon dioxide away from a furnace).

As further illustrated in FIG. 1, the electric generation system 120 can direct heat and/or electricity into the cooling system 140. The cooling system 140 utilizes the heat and/or electricity circulate cold air. In various embodiments, the cooling system 140 can include an absorption chiller, a compression air conditioner, and/or a heat pump. In some embodiments, the cooling system 140 is operably coupled directly the reactor system 110 to receive hydrogen gas and/or heat (not shown). In such embodiments, the cooling system 140 utilizes the hydrogen gas and/or heat to drive a cooling system, such as any of the systems described above. Further, in some embodiments, the cooling system 140 can be integrated with and/or into the circulation system 130.

In some embodiments, the reactor system 110 and/or the electric generation system 120 can direct heat and/or electricity to a heating component and/or a cooling component without circulating energy. For example, the heating component (e.g., the condensing heat exchanger 132) can receive heat from the reactor 112, transfer the heat into a fluid (e.g., water, air, or another suitable fluid), and direct the heated fluid into the heating grid 50 without receiving a fluid back. In a specific example, the heating component can receive heat from the reactor 112, transfer the heat into water from an outside supply, and direct the hot water into a residential space. The used hot water then drains into a sewage and/or greywater disposal system rather than circulating back into the circulation system 130. In another specific example, the cooling component can receive heat and/or electricity from the power generation component 124, use the heat and/or electricity to drive a cold air generator, and direct the cold air into a residential space. The cold air can then dissipate in the residential space while the cooling component can pull new air for cooling from an outside source.

In various embodiments, the reactor system 110, the electric generation system 120, the circulation system 130, and/or the cooling system 140 can include one and/or more sensors (not shown) to collect data associated with the components of the system. For example, the sensors can measure a weight or optical characteristic of the solid carbon produced by the reactor system 110. The data from these sensors can then be used to generate a report on the amount of carbon removed from the reactant, allowing users to access carbon credits or carbon reduction payments (e.g., from state, federal, and/or commercial carbon markets). The data can also be used to alert the user that the carbon disposal component 20 is full (or close to full), prompting the user to empty the carbon disposal component 20.

In some embodiments, the sensors can measure electrical characteristics at the reactor 112 (e.g. conductivity, frequency-dependent conductivity, electrical impedance spectroscopy, and/or any other suitable characteristics). In some embodiments, the sensors can perform ultrasound measurements to determine reactant flow through the reactor 112 and/or a build-up of carbon within the reactor 112. In some embodiments, gas flow rate sensors can determine a ratio of reactant (e.g., methane) to a product (e.g., hydrogen) flowing out of the reactor 112. In such embodiments, the ratio can indicate the extent of the pyrolysis reaction occurring within the reactor 112. In some embodiments, thermocouples or other temperature sensors measure the temperature of the reactor 112, the flue gas from the burner(s) 116, the power generator(s) 124, the condensing heat exchanger 132, and/or any other suitable component of the system 100. In some embodiments, hydrogen gas sensors (e.g., sensors that pass a current through palladium wires) monitor the reactant conversion and/or hydrogen production rate.

In some embodiments, the system 100 includes a controller 150 operably coupled via input/output (I/O) links to the sensors and various components of the system. Based on any of the measurements discussed above, the controller 150 can adjust the operation of the system 100. For example, the controller 150 can adjust the input flow of reactant and/or the operating temperature of the reactor 112 based on the ratio of reactant to hydrogen gas measured coming out of the reactor 112 (e.g., to increase/decrease the amount of hydrogen in the ratio). In some embodiments, the controller 150 contains a memory storing past conditions and hydrogen consumption, as well as a predictive analytics component. Based on any of the measurements discussed above and data from the memory, the predictive analytics component can determine an adjustment for the operation of any of the components in the system 100 and the controller 150 can complete the adjustment. For example, the predictive analytics can determine periods of high and low hydrogen demand and the controller 150 can toggle the reactor 112 on and off (e.g., by starting and stopping the input of the reactant) according to the determined periods.

As discussed above, the system 100 is scaled to produce and utilize the hydrogen gas for a single room, a single residential home, a multifamily home, an apartment building, a residential neighborhood, a public building (e.g., a single store, government building, hospital, school, or any other suitable space), a commercial building (e.g., an office building), a datacenter, or any other suitable space. The scale can be quantified in terms of typical reactant consumption rates. For example, using methane as the reactant, typical scales include a natural gas flowrate range of from about 500 standard cubic centimeters per minute (sccm) to about 37,500 sccm for a single family residence (e.g., a standalone house or single unit in a multifamily building); from about 150,000 sccm to about 3,750,000 sccm for a multi-family building with a centralized system 100; and from about 150,000 sccm to about 3,750,000 sccm for a neighborhood with a centralized system 100. In another quantification example, using methane as the reactant, typical scales include a natural gas consumption rate of from about 10 million British thermal units per year (MMBtu/year) to about 164 MMBtu/year for a single family residence (or about from about 15981 Btu/hr to about 18721 Btu/hr); from about 4875 MMBtu/year to about 6300 MMBtu/year for a small multi-family building; from about 9500 MMBtu/year to about 136,189 MMBtu/year for a commercial building (e.g., an industrial site, and office, a campus, an airport, a hospital, a mall, and/or any other suitable commercial building) with a centralized system 100; from about 453,963 MMBtu/year to about 1,232,184 MMBtu/year for a larger multi-family building and/or a neighborhood; and from about 2,468,421 MMBtu/year to about 3,350,000 MMBtu/year for data centers with high power and cooling demands.

FIG. 23 contains a table with additional examples of the scales for various applications, as well as the power consumed by specific components of the system 100 at the different scales. As illustrated, the table shows the power, heating, cooling, and natural gas required for different embodiments of the system 100 (FIG. 1), as well as the approximate scales for each embodiment in terms of demand and usage. The illustrated scales include: residential, commercial, district, and data center usage and the associated needs for power, heat, and cooling. Accordingly, the table of FIG. 23 provides context to differentiate the needs and system requirements for these embodiments in contrast to the much larger scales used in industrial generation of hydrogen. It will be understood, however, that the values in the table of FIG. 23 are illustrative as examples only, and that the intention is not to limit the technology to the particular examples that are illustrated.

Returning to FIG. 1, in any of the applications discussed above, the system 100 can include multiple reactors 112 to meet the consumption demands of the space in which the system 100 is deployed. For example, using methane as the reactant, a single reactor can have a $CH_4$ consumption rate of from about 500 sccm to about 172,853,881 sccm, or from about 10 MMBtu/year to about 3,350,000 MMBtu/year. This range is significantly below a typical output for industrialized pyrolysis reactors, even when multiple reactors 112 are used in conjunction. To enable the reactor 112 to operate efficiently at the scales required for localized consumption, especially at the residential level, the reactor includes features to address a number of shortcomings.

First, the carbon produced by the pyrolysis reaction in typical embodiments is removed from the reactor 112 and separated from the product stream while balancing safety, efficiency, and convenience concerns. For example, the carbon can be removed from the reactor 112 in a way that provides separation between a user to and the relatively high temperature components of the reactor 112. Further, the carbon needs to be separated by a system that does not require overly frequent (e.g., hourly, daily, weekly, etc.) upkeep, or a user may be unwilling to adopt the reactor. In another example, the carbon can be separated by a system that does not consume too much power, or the efficiency of the system 100 may fall below a usable level. Accordingly, in various embodiments, the reactor system 110 can include features that help address these concerns.

Second, because of the cyclical and/or uneven demand for heat and electricity in a residential and/or single building setting, the output of the reactor 112 may need to be frequently modulated. In some embodiments, the target modulation scale is on the order of minutes to hours. Further, in some embodiments, the modulation includes periods when no hydrogen gas is demanded (e.g., when a residence is unoccupied during a work day) and when hydrogen gas is demanded at a rate higher than it can be produced by the reactor (e.g., during peak power consumption times).

Third, the reactor 112 may be subject to space constraints, for example when the reactor is retrofitted into an existing appliance space (e.g., a furnace space). Accordingly, the reactor 112 can include features that allow a reactor 112 adapted to the space constraints to operate efficiently despite the space constraints. Relatedly, the system 100 and/or the reactor 112 can include features that help to reduce and/or minimize parasitic heat loss, thereby increasing (or maximizing) energy efficiency from the reactor 112. For example, as discussed above, the reactor 112 can be coupled to the circulation system 130 to recycle parasitic heat loss in the circulation system 130. Concerns regarding the efficiency of the system 100 and/or the reactor 112 can be especially important in residential scale reactors, since they can have a relatively high surface area to volume ratio relative to industrial scale columns, and therefore can have more parasitic heat loss. In addition, the reactor 112 can include monitoring and control schemes that are unique to the residential scale and/or localized consumption of the hydrogen gas product.

Additional details on the features the system 100 and/or the reactor system 110 include to meet these challenges are discussed with respect to FIGS. 3-19 below.

Figure 2:
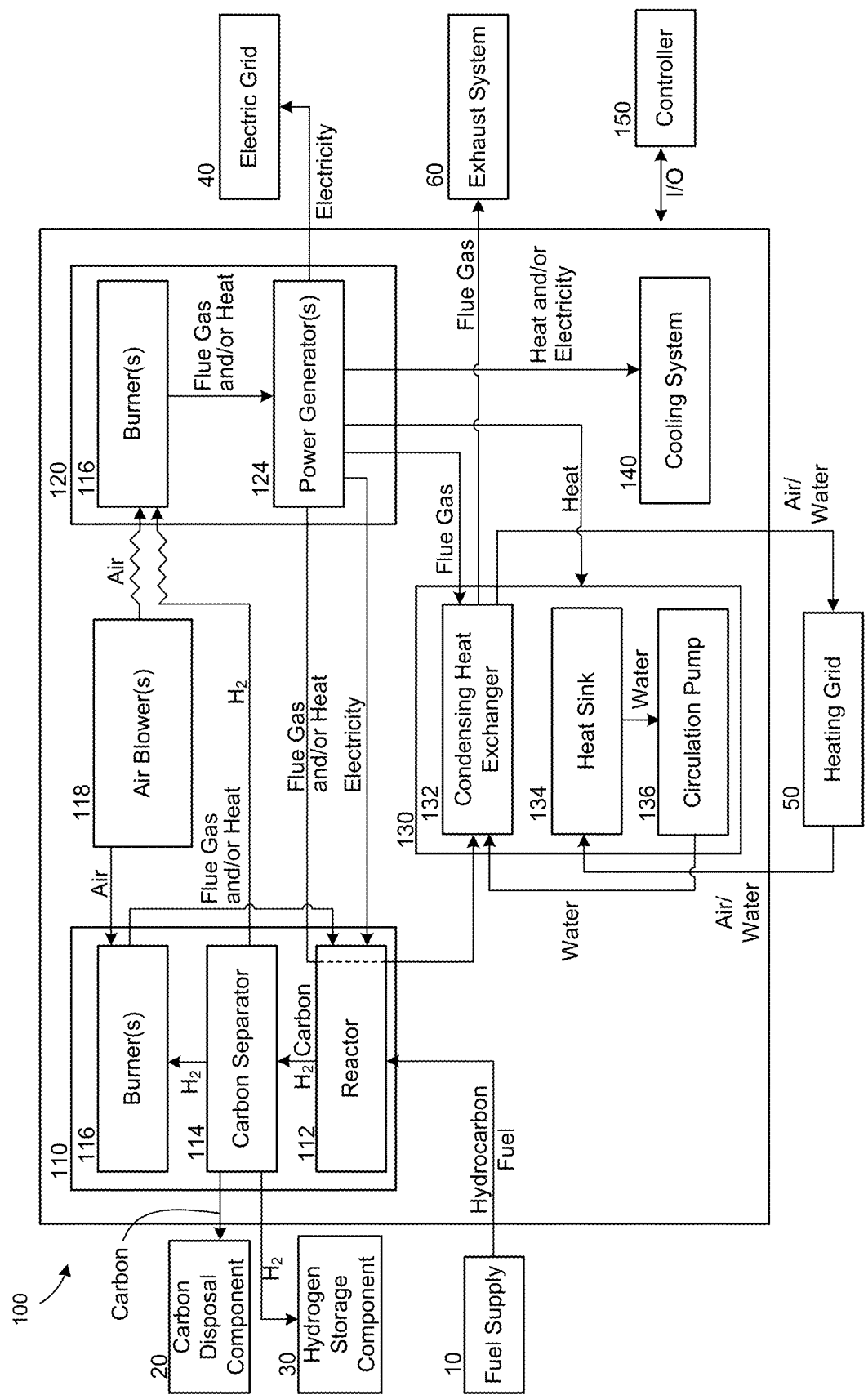
FIG. 2 is a block diagram of a system for producing hydrogen gas for local distribution, consumption, and/or storage in accordance with further embodiments of the present technology.

FIG. 2 is a block diagram of a system 100 for producing hydrogen gas for local distribution, consumption, and/or storage in accordance with further embodiments of the present technology. The system 100 illustrated in FIG. 2 is generally similar to the system 100 described above with respect to FIG. 1. For example, as illustrated, the system 100 includes a reactor system 110 operably coupled to a fuel supply 10, an electric generation system 120 operably coupled to the reactor system 110, and a circulation system 130 operably coupled to the reactor system 110 and the electric generation system 120. However, in the illustrated embodiment, the outputs from the power generator(s) 124 are modified. For example, as illustrated, electricity from the power generator(s) 124 can be sent to the reactor system 110 to power one or more components of therein. For example, the electricity can power heat generators (e.g., resistive coils coupled to the reactor, input valves, output valves, the carbon separator 114, and/or any other suitable component. In the illustrated embodiment, hot flue gas from the power generator(s) 124 is sent directly to the condensing heat exchanger 132 to deliver heat into the circulation system 130.

Figure 3:
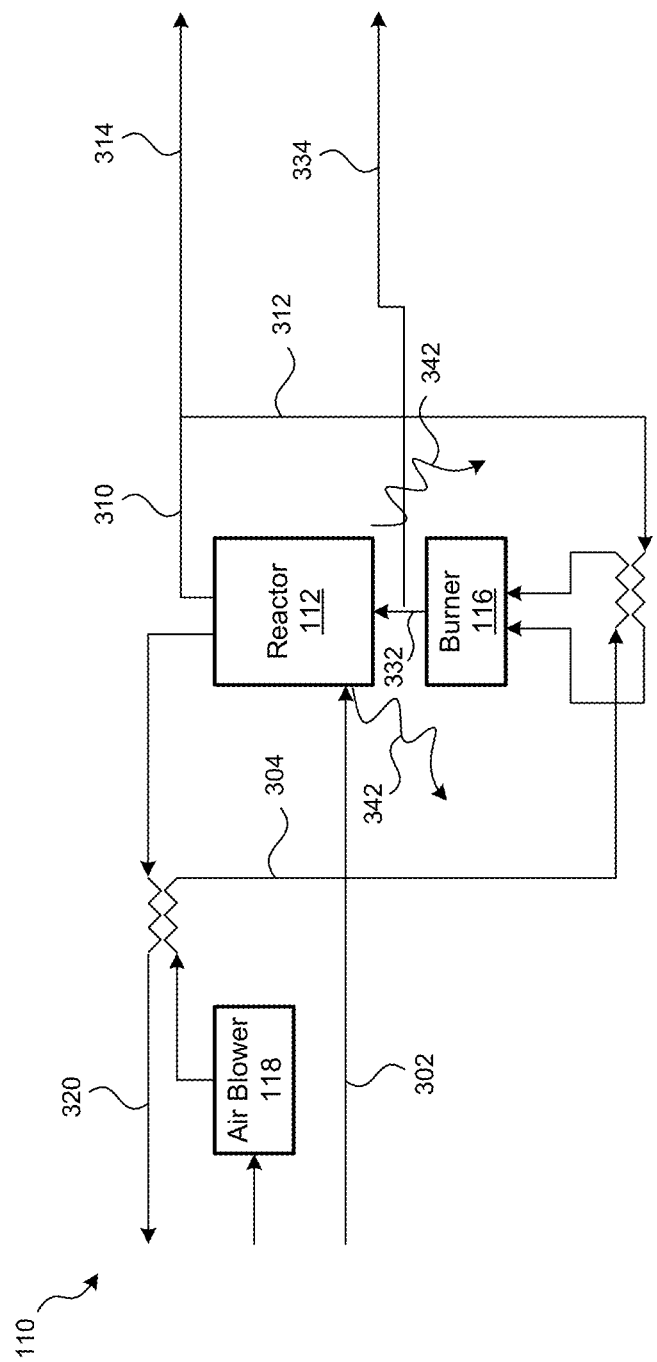
FIG. 3 is a block diagram of reactor system for producing hydrogen gas in accordance with some embodiments of the present technology.

FIG. 3 is a schematic diagram of the flow of materials through the reactor system 110 in accordance with some embodiments of the present technology. As illustrated, a reactant enters the reactor along an input path 302. As described above, the reactant can be natural gas and/or pure methane. Accordingly, the input path 302 can be connected to existing gas lines to supply the reactant to the reactor 112. The reactor 112 controllably heats the reactant beyond an enthalpy point, which represents the minimum energy for any amount of the pyrolysis reaction to occur (e.g., the reactor 112 provides at least an initiation energy). As a result, the reactor 112 causes a pyrolysis reaction that breaks hydrocarbons in the reactant into hydrogen gas and carbon. For example, for a methane reactor, the pyrolysis reaction is:

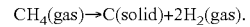

$$CH_4(gas) \rightarrow C(solid) + 2H_2(gas).$$

Further, for $CH_4$, the enthalpy point is about 75 kJ per mol of $CH_4$, which causes the $CH_4$ to heat to about 650° C. In some embodiments, to ensure the pyrolysis reaction fully occurs for relatively short residence times (e.g., on the order of seconds), the reactor 112 controllably heats the reactant above about 1300° C. In some embodiments, the reactor 112 is or includes a heated column containing a molten material such as molten metal, molten salt, and/or a combination thereof. The hot liquid can include pure materials or a mixture of multiple materials. In such embodiments, the reactant is delivered into the reactor 112 under the surface of the liquid, for example by a subsurface delivery tube or a porous sparger. The reactor includes a component to cause the reactant to separate into bubbles that are carried to the top of the heated column by their buoyancy. As the bubbles rise, the hot liquid delivers heat to the reactant to cause the pyrolysis reaction described above. In some embodiments, the reactor 112 includes one or more heat storage device, which can have a reaction chamber in accordance with some embodiments discussed below. Each reaction chamber includes insulating a heat exchange material and one or more flow paths for the reactant through the heat exchange material. The heat exchange material can be selected based on the material's relatively low thermal conductivity, relatively low thermal coefficient of expansion, and/or relatively high thermal stability. In various embodiments, the heat exchange material can include cordierite, mullite, alpha alumina, and/or combinations thereof. As the reactant flows through the flow paths, the heat exchange material delivers heat to the reactant to cause the pyrolysis reaction described above.

As further illustrated in FIG. 3, the output from the reactor 112 is split into a hydrogen path 310 and a carbon path 320 corresponding to the two products from the pyrolysis reaction. Hydrogen gas is directed into the hydrogen path 310 while carbon particulates are directed to the carbon path 320. As discussed above, the hydrogen in the path hydrogen 310 can be directed back into the reactor system 110 and/or elsewhere in the system 100 (FIG. 1). Meanwhile, the carbon path 320 can be directed to a disposal system (e.g. the carbon disposal component 20 discussed with respect to FIG. 1). As illustrated, the carbon path 320 can be in fluid communication with the air blower 118 to help ensure the carbon particulates travel all the way to the carbon disposal component 30 (FIG. 1), rather than clogging an outlet from the reactor 112. In some embodiments, the split is accomplished by a carbon separator (not shown) that is separate from and in fluid communication with the reactor 112. In some embodiments, for example as discussed in more detail below with respect to FIGS. 6-8, the split is accomplished by a carbon separator (not shown) integrated into the reactor 112.

In the illustrated embodiment, the reactor system 110 further splits the hydrogen path 310 of hydrogen gas into first and second hydrogen paths 312, 314. A portion of the hydrogen gas is directed towards the burner 116 in the first hydrogen path 312. The burner 116 mixes and combusts the hydrogen gas in the first hydrogen path 312 with air from the air blower 118 in an air input path 304 to provide heat to the reactor 112. The heat compensates for parasitic heat loss from the reactor 112 and supplies the energy necessary to heat the reactant beyond the enthalpy point to cause the pyrolysis reaction. Meanwhile, a portion of the hydrogen gas is directed out of the reactor system 110 along the second hydrogen path 314 for any of the purposes described above with respect to FIG. 1. That is, the hydrogen gas directed out of the reactor system 110 along the second hydrogen path 314 can be used to generate heat and/or electricity within the system 100, can be stored for later use, and/or can be put into further distribution. For example, in a neighborhood or multi-family scale device, the hydrogen gas exiting the reactor system 110 along the second hydrogen path 314 can be delivered to individual homes or units through a pipe system for local consumption.

As further illustrated in FIG. 3, the flue gas from the burner 116 exits the reactor system through a flue path 334 after heating the reactor 112. In some embodiments, the flue path 334 is directed to other systems for consumption (e.g., to the electric generation system 120 and/or the circulation system 130 discussed above with respect to FIG. 1). In some embodiments, the flue path 334 is directed to an exit to be emitted (e.g., into the exhaust system 60 discussed above with respect to FIG. 1).

Figure 12:
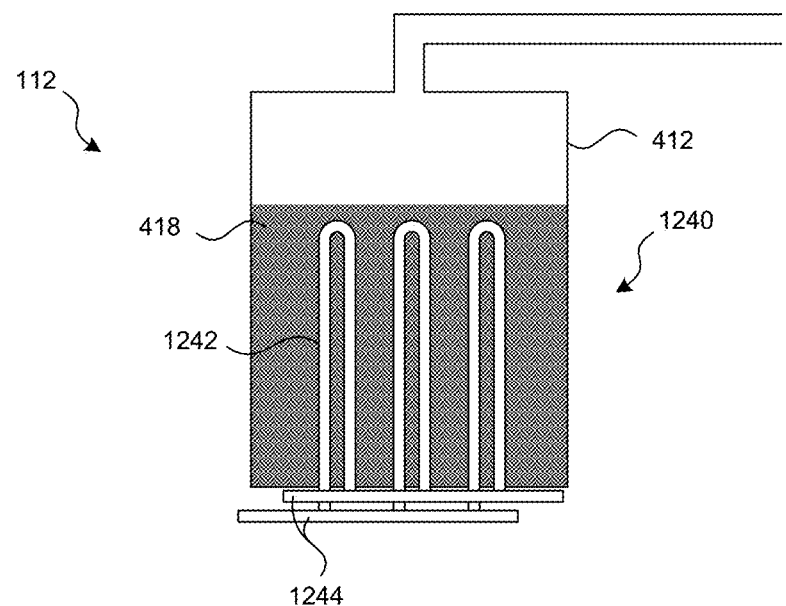
Figure 13:
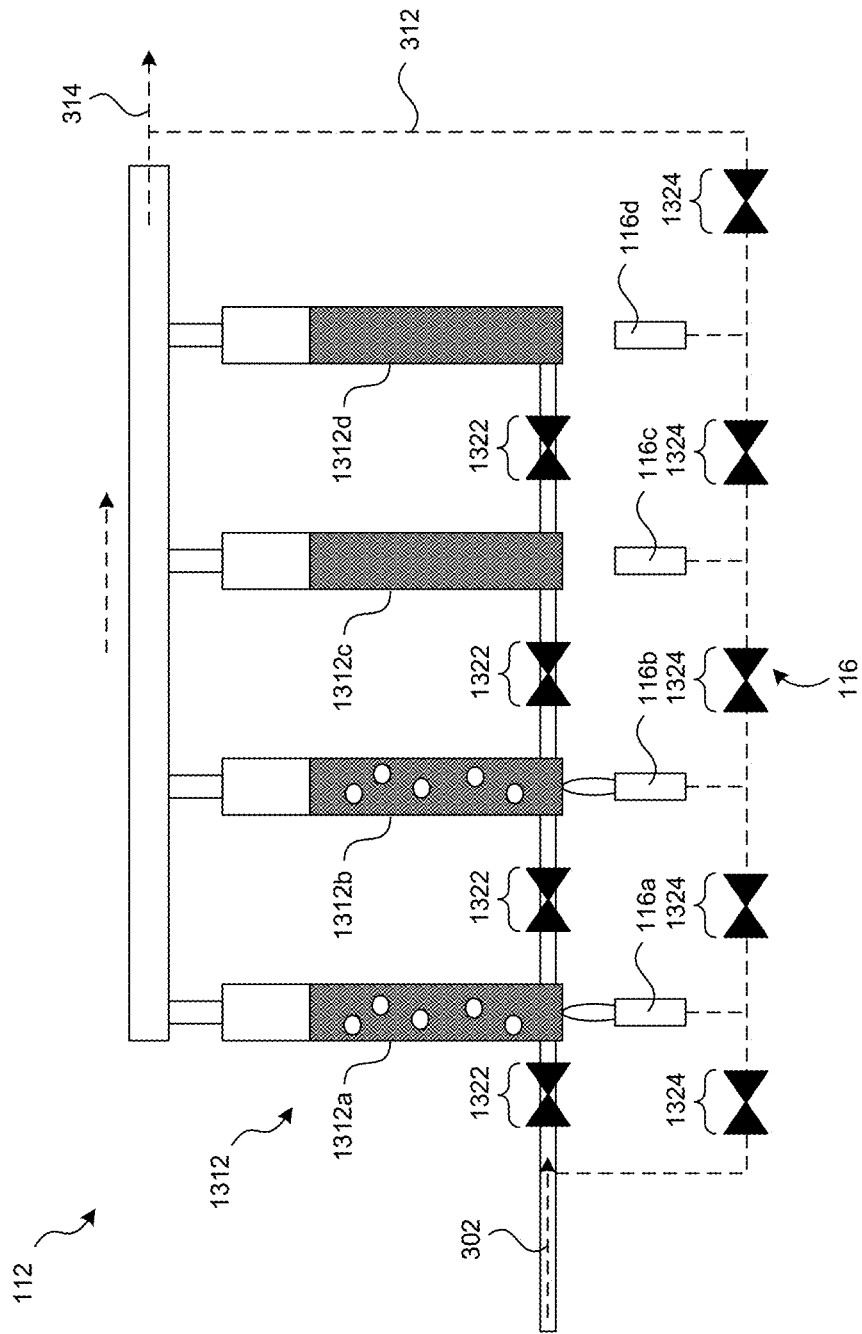
FIG. 13 is a schematic diagram of a reactor system divided into multiple reaction chambers in accordance with various embodiments of the present technology.
Figure 14:
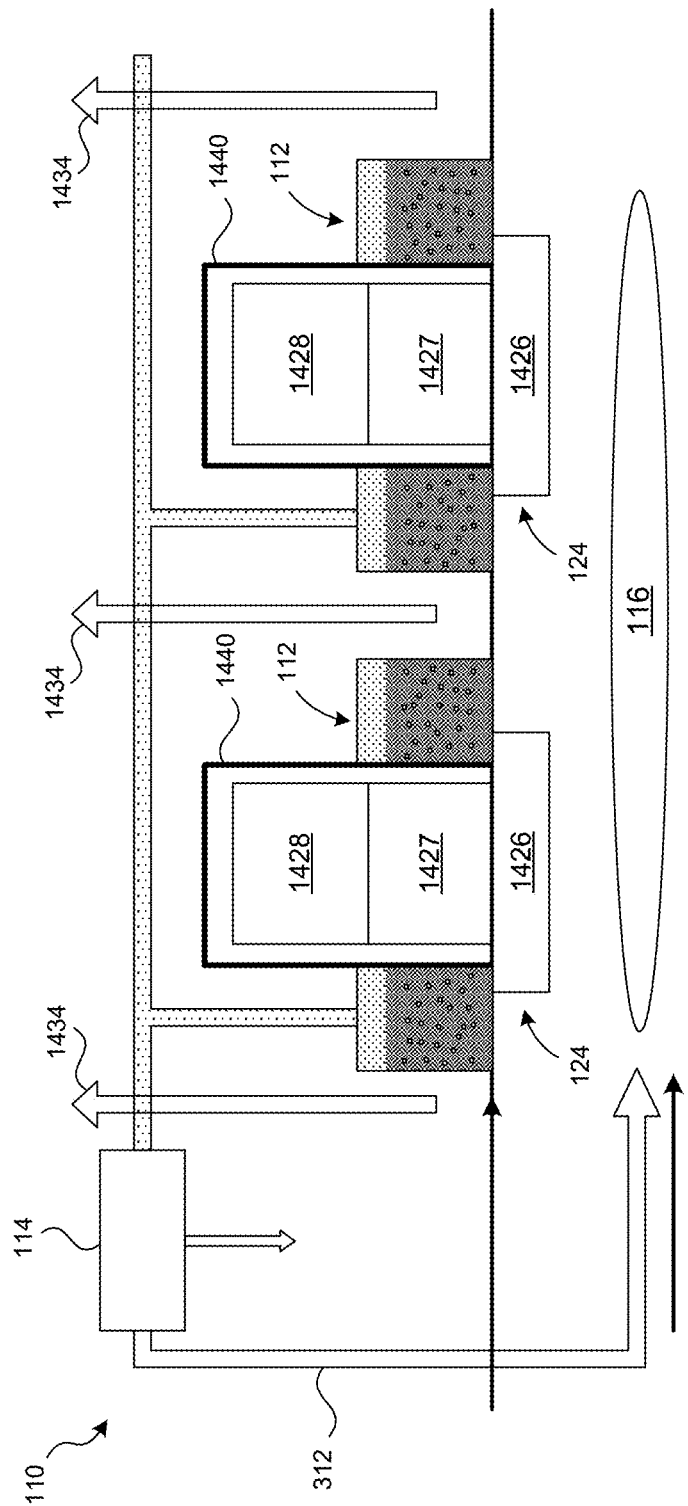
FIG. 14 is a schematic diagram of a reactor system coupled to an electrical power generation system in accordance with some embodiments of the present technology.

In the following discussion, FIGS. 4-15 illustrate features of the system as applied to a molten material embodiment of the reactor 112 while FIGS. 16-21 illustrate features of the system as applied to a regenerative reaction chamber embodiment of the reactor 112. However, one of skill in the art will understand that the features are not necessarily limited to the embodiments in which they are discussed. For example, the arrangement of the reactor 112 in parallel with the power generators 124 discussed below with respect to FIG. 14 is not limited to the molten material embodiment of the reactor 112. Accordingly, the scope of the disclosed technology is not confined to any subset of embodiments discussed below.

Figure 4:
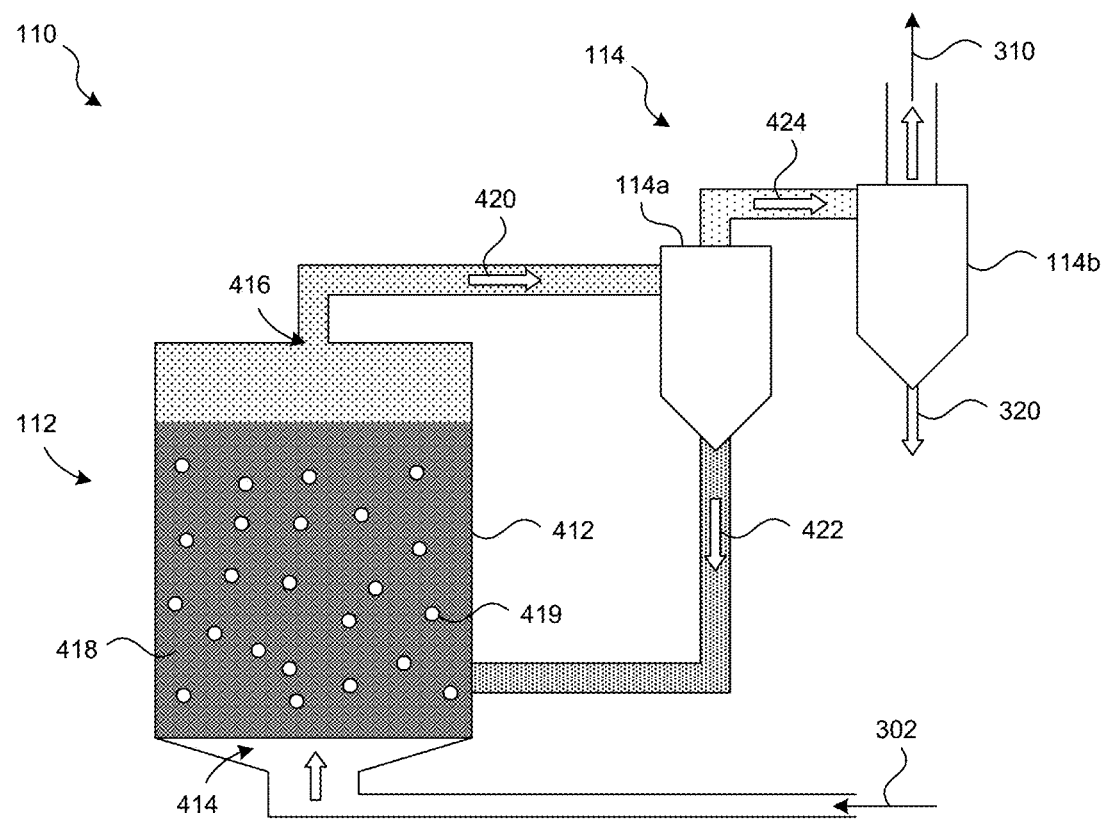
FIG. 4 is a schematic diagram of a reactor system coupled to a carbon separator in accordance with some embodiments of the present technology.

FIG. 4 is a schematic diagram of a reactor system 110 configured in accordance with some embodiments of the present technology. In the illustrated embodiment, the reactor 112 includes a main body 412 with a first end 414 and a second end 416. The portion of the reactor 112 towards first end 414 is in fluid communication with a reactant source (e.g., fuel source 10 (FIG. 1)) and delivers the reactant in the input path 302 to the main body 412. The main body 412 includes a molten material 418 that controllably delivers heat to bubbles 419 of the reactant flowing from the first end 414 towards the second end 416. The heat from molten material 418 causes the pyrolysis reaction to occur within the main body 412. The resulting carbon particulates and hydrogen gas exit the main body 412 toward the second end 416 along a first exit path 420. In some embodiments, some of all of the carbon particulates are not carried out of the main body 412 by the flow of the hydrogen gas along the first exit path 420. Accordingly, in some embodiments, such as those discussed in more detail below with respect to FIGS. 6-10, the main body 412 can include an integrated carbon separator that separates some (or all) of the carbon from the hydrogen gas and the molten metal within the main body 412. In some embodiments, for example as discussed in more detail below with respect to FIG. 5, the main body 412 can include features that increase the amount of carbon carried out of the reactor 112 along the first exit path 420.

The first exit path 420 delivers the carbon particulates and hydrogen gas to one or more carbon separators 114 (two shown, referred to individually as a first carbon separator 114a and a second carbon separator 114b). The carbon separators 114 can remove particles in series based on their size and/or composition. For example, the first carbon separator 114a removes relatively large carbon particulates and/or carbon particulates that are contaminated with molten metal (e.g., carrying some molten metal), while the second carbon separator 114b can remove smaller particles to further refine the output stream of hydrogen gas. In the illustrated embodiment, the first carbon separator 114a removes contaminated particles from the first exit path 420. The first carbon separator 114a then directs the contaminated particles back to the main body 412 along a reentrance path 422 and directs the filtered output towards the second carbon separator 114b along a second exit path 424. In turn, the second carbon separator 114b can remove non-contaminated carbon particulates from the output in the second exit path 424. The second carbon separator 114b can then direct filtered hydrogen gas outwards along the hydrogen path 310 and the solid carbon outwards along the carbon path 320.

The main body 412 can be made from a material with a melting point above the operating temperature for the reactor 112. For example, in one embodiment, the main body 412 can be made from quartz. Further, as discussed above, the molten material 418 can include a suitable molten metal, molten salt, and/or a combination thereof. The molten material 418 can consist of pure materials (e.g., a single molten metal) or a mixture of multiple materials (e.g., multiple molten metals).

As discussed above, one obstacle for efficient operation of the reactor 112 is efficiently and safely removing carbon from the reactor 112 and/or from hydrogen gas in the output stream of the reactor. FIGS. 5-10 are schematic diagrams of reactors 112 of the type shown in FIG. 4, with features for removing carbon from the reactor 112 and/or the output in accordance with various embodiments of the present technology.

Figure 5:
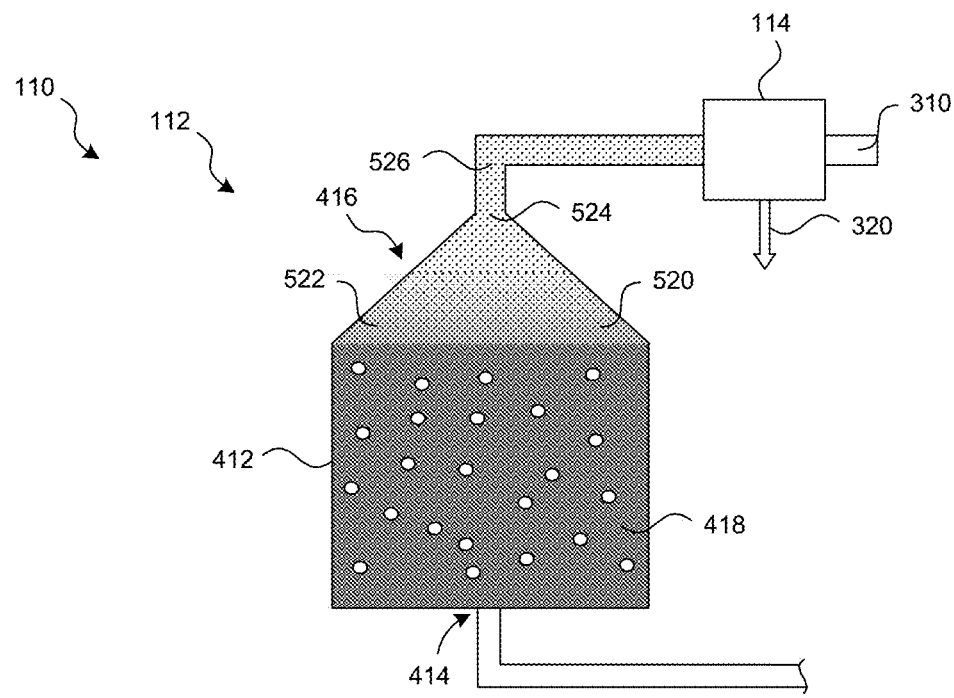
FIG. 5 is a schematic diagram of a reactor system with features to encourage a carbon particulate flow out of the reactor system in accordance with some embodiments of the present technology.

FIG. 5 is a schematic diagram of a reactor system 110 with features that encourage the flow of carbon particulates out of the reactor 112 in accordance with some embodiments of the present technology. Like the reactor 112 discussed above with respect to FIG. 4, the illustrated reactor includes the main body 412 extending from the first end 414 to the second end 416. The first end 414 is in fluid communication with a reactant source, while the second end 416 is in fluid communication with other components of the reactor system 110. In the illustrated embodiment, the main body 412 of the reactor 112 includes a conical component 520 that accelerates the flow of fluids out of the second end 416 of the reactor 112 to help carry carbon particulates away. For example, the diameter of the main body 412 is relatively wide. Accordingly, in the main body 412, the reactant can have a low superficial velocity that allows the pyrolysis reaction to fully occur. In a first region 522 of the conical component 520, the conical component 520 has a diameter that generally matches the main body to transition the output of the reactor into the conical component 520. In the second region 524 the diameter becomes progressively narrower, thereby causing an increase in the output's superficial gas velocity. In the third region 526 near the second end 416, the diameter is even more narrow. As a result, in the third region 526, the output's superficial gas velocity can carry lighter carbon particulates (e.g., carbon with less or no metal contamination) out of the reactor 112 and towards the carbon separator 114. In the illustrated embodiment, the reactor system 110 includes a single carbon separator 114 that directs filtered hydrogen gas from the output into the hydrogen path 310 and carbon particulates from the output into the carbon path 320.

FIGS. 6-10 are schematic diagrams of reactors 112 of the type shown in FIG. 4 that include an integrated carbon separator 114 in accordance with various embodiments of the present technology. For example, like the reactor 112 discussed above with respect to FIG. 4, the reactors 112 illustrated in FIGS. 6-10 each include the main body 412 extending from the first end 414 to the second end 416. The first end 414 is in fluid communication with a reactant source, while the second end 416 is in fluid communication with other components of the reactor system 110. As discussed above, in some embodiments, the flow of the output does not carry all (or any) of the carbon particulates out of the reactor 112. In such embodiments, the reactor 112 can include one or more of the integrated carbon separators 114 discussed below to avoid large carbon build ups within the reactor 112.

Figure 6:
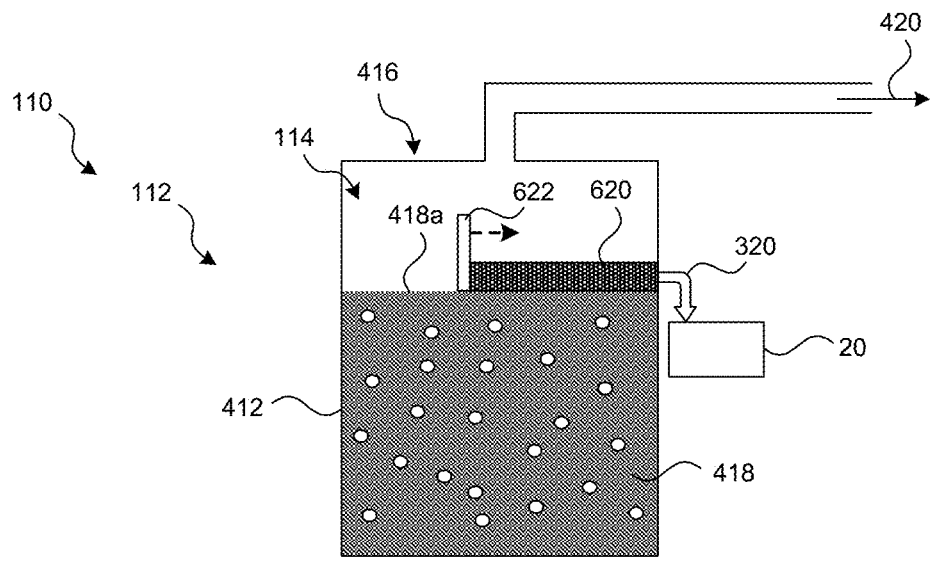
FIGS. 6-10 are schematic diagrams of reactor systems with an integrated carbon separator configured in accordance with various embodiments of the present technology.
Figure 7:
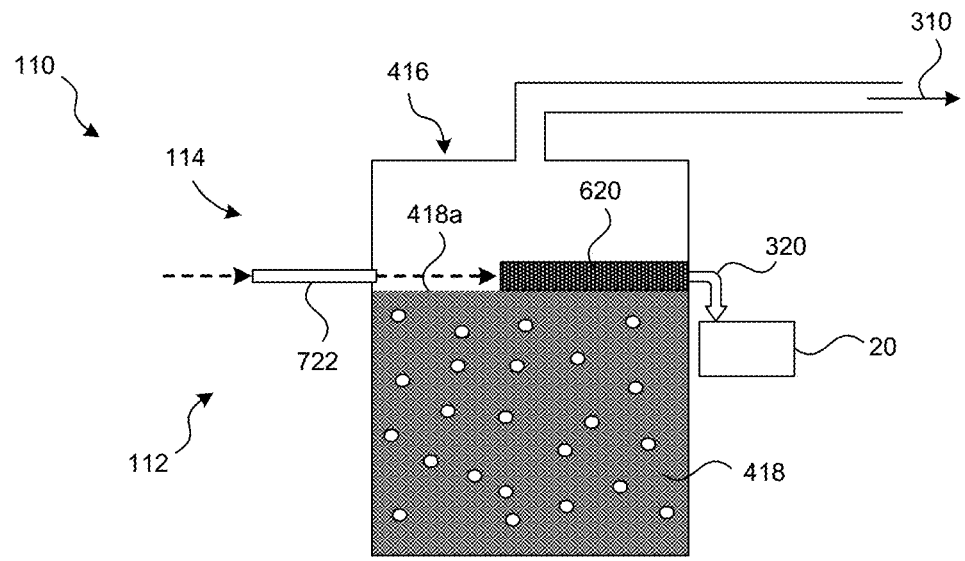
Figure 10:
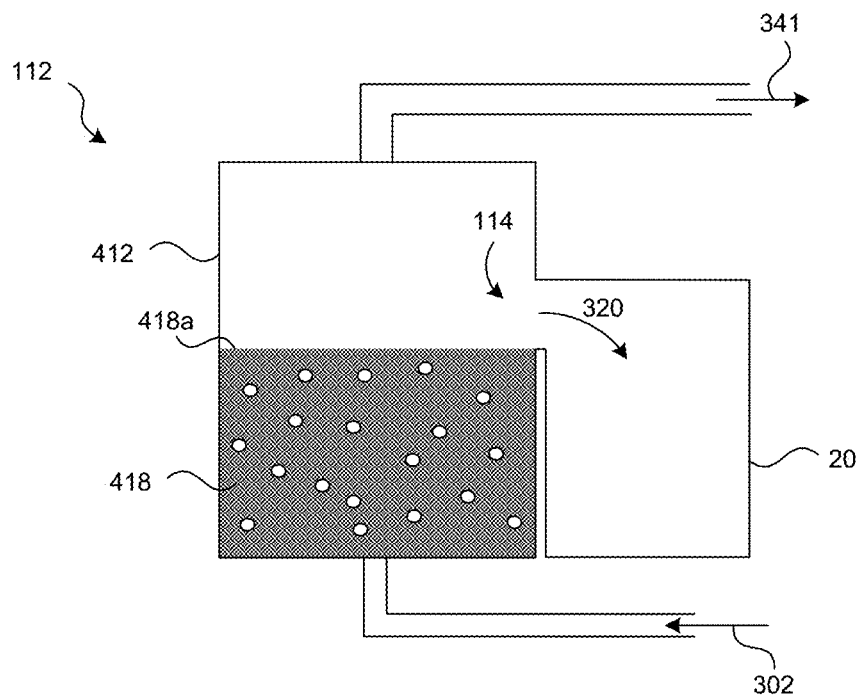

In some embodiments, as illustrated in FIGS. 6, 7 and 10, the carbon particulates concentrate on an upper surface 418a of the molten material 418. For example, in some embodiments, the flow of the reactant through the main body 412 is sufficient to propel carbon particulates through the molten material 418, but insufficient to carry the carbon particulates above the metal material. Accordingly, the reactor 112 can include a carbon separator 114 that skims the upper surface 418a of the molten material 418 to remove carbon from the reactor 112.

For example, as illustrated in FIG. 6, the carbon separator 114 can include a mechanical skimming component 622 that skims the upper surface 418a to push a carbon build-up 620 out of the reactor 112 and into the carbon path 320 towards the carbon disposal component 20. Alternatively, or additionally, the carbon separator 114 can include a fluid skimming component 722, as illustrated with respect to FIG. 7. The fluid skimming component 722 can direct a fluid (e.g., air or any other suitable fluid) across the upper surface 418a of the molten material 418 to push the carbon build-up 620 out of the reactor 112 and into the carbon path 320 towards the carbon disposal component 20. In some embodiments, the mechanical skimming component 622 and/or the fluid skimming component 722 periodically skim the upper surface 418a. For example, the mechanical skimming component 622 and/or the fluid skimming component 722 can skim the upper surface 418a while the reactor 112 is otherwise inactive (e.g., between periods of hydrogen gas consumption). In some embodiments, the mechanical skimming component 622 and/or the fluid skimming component 722 continuously skim the upper surface 418a. In some embodiments, the mechanical skimming component 622 and/or the fluid skimming component 722 continuously skim the upper surface 418a only during specific (e.g., recurring, ideal) periods. For example, the mechanical skimming component 622 and/or the fluid skimming component 722 can continuously skim the upper surface 418a while the reactor 112 is active to keep the upper surface 418a clear, and reduce skimming the upper surface 418a while the reactor 112 is inactive to improve the efficiency of the reactor system 110 (FIG. 1).

Additionally, or alternatively, the reactor 112 can include a passive carbon separator 114 that allows carbon from the upper surface 418a of the molten material 418 to fall out of the reactor 112 and/or into the carbon disposal component 20, for example as illustrated in FIG. 10. In some such embodiments, such as the embodiment illustrated in FIG. 10, the main body 412 of the reactor 112 can include a passive carbon separator 114. In the illustrated embodiment, the carbon separator 114 includes an opening in the main body 412 of the reactor that allows carbon collecting on the upper surface 418a of the molten material 418 to fall out of the reactor 112 and into the carbon path 320 towards the carbon disposal component 20. One benefit of a passive carbon separator 114 is an increase in efficiency for the system 100 (FIG. 1) since little (or no) energy is required to remove the carbon from the reactor 112. However, the passive carbon separator 114 can also lower the efficiency of the reactor 112 if too much heat can escape through the passive carbon separator 114.

Figure 8:
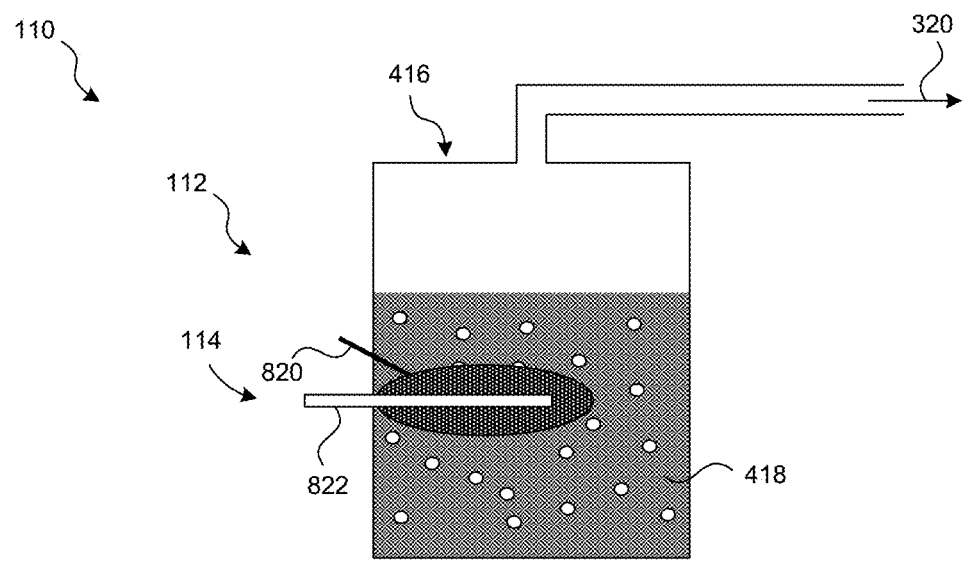

In some embodiments, as shown in FIG. 8, the carbon particulates concentrate around a carbon build-up 820 within the molten material 418. For example, in some embodiments, the carbon build-up 820 forms around the point that the reactant reaches the enthalpy point and the pyrolysis reaction occurs. That is, after the pyrolysis reaction, some of the carbon particulates can stop moving through while the hydrogen gas and/or other carbon particulates continue through the molten material 418. Accordingly, in some embodiments, the reactor 112 includes a carbon separator 114 that collects carbon at a precipitation component 822 within the molten material 418 for periodic and/or continual removal. In such embodiments, the precipitation component 822 helps control precipitation of the carbon out of the output and collects the carbon within the molten material 418.

Figure 9:
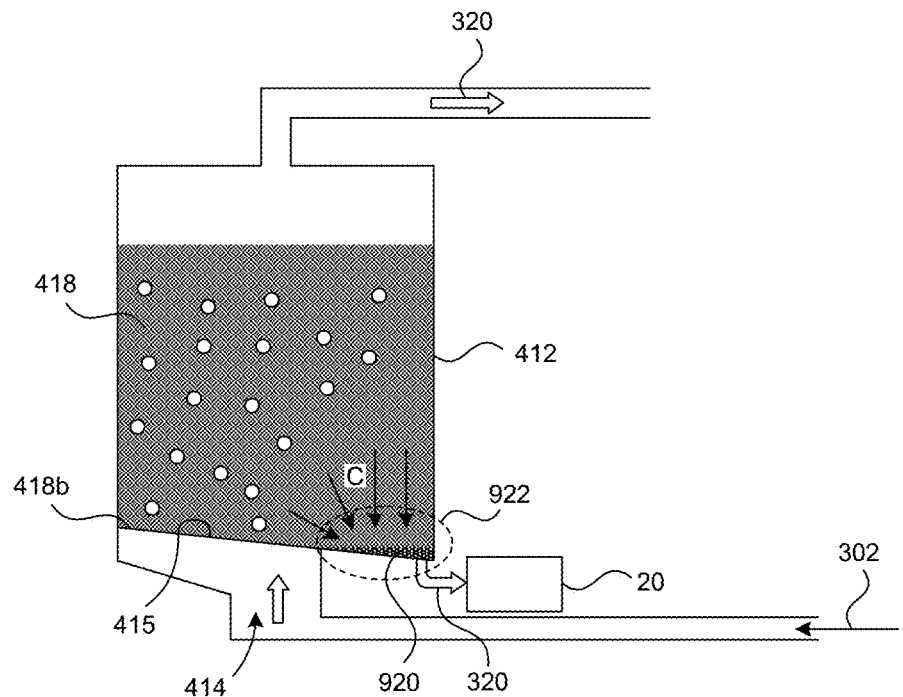

In some embodiments, as shown in FIG. 9, the carbon particulates concentrate around a lower surface 418b of the molten material 418 and near the first end 414 of the reactor 112. For example, in some embodiments, some carbon resulting from the pyrolysis reactor is denser than the hot molten material 418 and therefore sinks towards the first end 414 of the main body 412. Accordingly, in some embodiments, the first end 414 of the main body 412 can include a surface 415 that slopes towards a portion 922 of the carbon separator 114 at a lowermost point of the main body 412. At the lowermost point, the portion 922 of the carbon separator 114 can collect a carbon build-up 920 from the main body 412 and direct the carbon particulates into the carbon path 320 towards the carbon disposal component 20. In some embodiments, the density of the molten material 418 is modulated relative to that of carbon by selectively adding one or more catalytically inactive components to the molten material 418 and/or by adjusting the temperature molten material 418. In such embodiments, the density of the molten material 418 is reduced, causing the carbon in the molten material 418 to sink towards the component 922 of the carbon separator 114 for collection and removal.

As discussed above, another obstacle for efficient operation of the reactor 112 is adapting the reactor to cyclical and/or uneven demand curves for hydrogen and/or power. Accordingly, in some embodiments, the reactor 112 can include features to address the uneven demand curves typical of a residential scale reactor. For example, for cyclical demand curves having periods when no (or little) hydrogen or energy is needed, the reactor 112 can include features that allow the reactor 112 to cool and quickly reheat to match demand. Alternatively, or additionally, the reactor 112 can include features that generate a small amount of heat to counterbalance parasitic heat loss during periods when no (or little) hydrogen or energy is produced so that there the reheating period is shorter when demand increases. Additional details of representative solutions are described below with respect to FIGS. 11-13.

Figure 11:
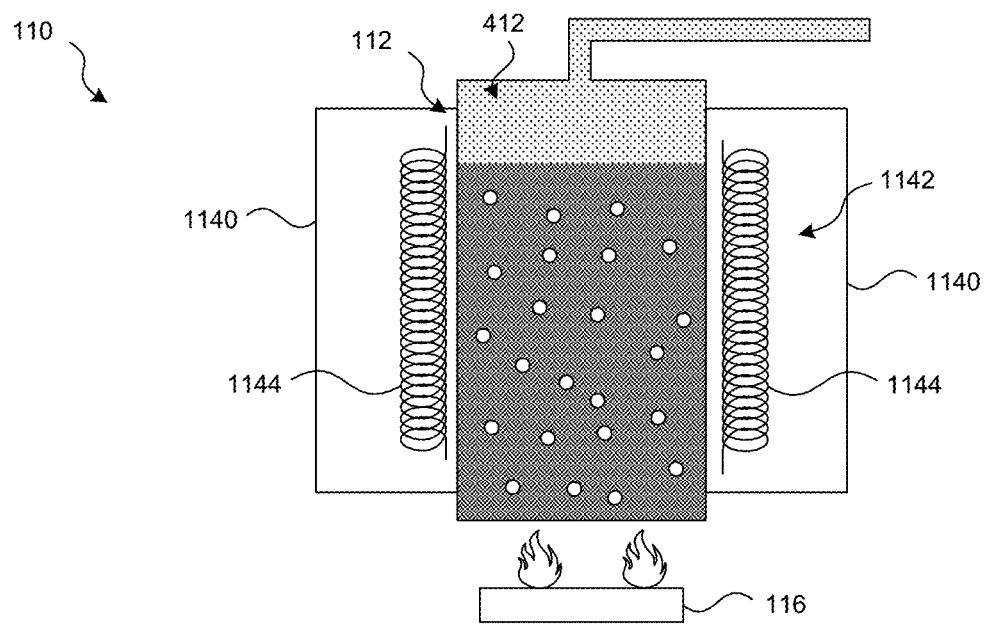
FIGS. 11 and 12 are schematic diagrams of reactor systems having integrated heating features in accordance with various embodiments of the present technology.

FIGS. 11 and 12 are schematic diagrams of reactor systems 110 that include quick-heating features integrated into the reactor 112 in accordance with various embodiments of the present technology. As illustrated with respect to FIG. 11, the main body 412 of the reactor 112 can be enclosed by a chamber 1140. The chamber 1140 includes a space 1142 and one or more electrical heaters 1144 (two shown). During periods of low demand, the space 1142 can be evacuated to reduce parasitic heat loss (e.g., creating at least a partial vacuum). In some embodiments, the internal surface of the chamber 1140 is reflective to further reduce parasitic heat loss. When demand begins to rise, the space 1142 can be filled (e.g., with air) and the electrical heaters 1144 can deliver heat around the main body 412 while the burner 116 delivers heat into the main body 412 to quickly reheat the reactor 112. In some embodiments, the electrical heaters 1144 deliver heat around the main body 412 during periods of low demand to further reduce the parasitic heat loss. Further, in some embodiments, the chamber 1140 includes a power generator (e.g., a thermoelectric generator) that captures a portion of the parasitic heat loss. In some such embodiments, the captured parasitic heat loss is then used to power the electrical heaters 1144 to reheat the reactor.

As illustrated in FIG. 12, the reactor can include a reheating system 1240 integrated into the main body 412 of the reactor 112. In the illustrated embodiment, the reheating system 1240 includes heating coils 1242 embedded within the molten material 418 and connected to supply lines 1244 outside of the main body 412. The heating coils 1242 can be electrical (resistive or inductive) and/or fluid coils (e.g., containing hot gasses, such as flue gas from a burner). By integrating the reheating system 1240 with the main body 412 of the reactor 112, the reheating system 1240 can quickly deliver heat to the center of the reactor, which may otherwise be slower to reheat. For example, when the temperature of the main body 412 falls below the melting point of the molten material 418, some of the material may solidify to prevent the flow of gas and/or material through the main body 412 during reheating. Accordingly, heating the center of the main body 412 requires conduction from the external surfaces of the main body 412. By delivering heat to the center of the main body 412 at the same time, the reheating system 1240 can accelerate the rate at which the reactor 112 is reheated. Further, in some embodiments, heating coils 1242 can also supply heat to the main body 412 during periods of low demand to counter the effect of parasitic heat loss.

It will be understood that, in some embodiments, the reactor system 110 can include both the chamber 1140 discussed above with respect to FIG. 11 and the reheating system 1240 discussed above with respect to FIG. 12 to accelerate the reheating process. Further, in various embodiments, the reactor system 110 can include an oversized burner to deliver a high amount of heating power to the reactor 112 during the reheating process; a porous media burner, such as a sparger, embedded in the main body 412 to flow a hot gas through the main body 412 during the reheating process; a system to run exothermic reactions inside the reactor 112; and/or various other suitable features to accelerate the reheating process. In embodiments having an oversized burner, the oversized burner can use a typical fuel gas (e.g., natural gas), hydrogen gas from a hydrogen storage component 30 (FIG. 1), and/or a mixture of the two. In embodiments having a porous media burner, the media burner can combust a fuel gas (e.g., natural gas, hydrogen, and/or a mixture of the two) during the reheating process, then deliver the reactant to the main body 412 after the reactor 112 reaches the operating temperature.

In some embodiments, the reactor 112 can additionally, or alternatively utilize a cascade approach to adapt the reheating process for a quick partial start-up. For example, the reactor 112 can include multiple reaction chambers arranged in series or parallel configurations. Each chamber can be sized to reheat quickly and have a net positive output after parasitic effects are accounted for during operation. Also, burner output can be modulated significantly, and the burner(s) can use a mixture of $CH_4$ and $H_2$ stream. FIG. 13 is a schematic diagram of an example of the reactor 112 divided into multiple reaction chambers 1312a-d in accordance with some embodiments of the present technology.

In the illustrated embodiment, the reactor 112 includes four reaction chambers (referred to individually as first-fourth reaction chambers 1312a-d) in fluid communication with the input path 302. A series of first valves 1322 control the flow of the reactant to each of the reaction chambers 1312, and a second series of valves 1324 control the flow of the reactant and/or the output from the reactor 112 to a series of burners 116 (referred to individually as first-fourth burners 116a-d). Each of the burners 116a-d individually corresponds to one of the reaction chambers 1312a-d. When demand first increases, the first reaction chamber 1312a can be reheated by the first burner 116a. During this initial period, the first burner 116a can combust the reactant (e.g., natural gas) and/or hydrogen stored from previous operation of the reactor 112 to reheat the first reaction chamber 1312a. Once the first reaction chamber 1312a is at the operating temperature, the reactant can be passed through the first reaction chamber 1312a to begin generating hydrogen gas.

A portion of the hydrogen gas can then be directed along the second hydrogen path 314 to meet the increasing demand while a portion of the hydrogen gas can be sent along the first hydrogen path 312 to begin reheating the second reaction chamber 1312b and/or to maintain the temperature of the first reaction chamber 1312a. In some embodiments, the first burner 116b can combust a combination of hydrogen gas from the first reaction chamber 1312a and the reactant to reheat the second reaction chamber 1312b. Once the second reaction chamber 1312b is at the operating temperature, the reactant can be passed through the second reaction chamber 1312b to increase the amount of hydrogen gas generated by the reactor 112. The reheating process can then continue for the third and fourth reaction chambers 1312c, 1312d.

As more of the reaction chambers 1312 reach the operating temperature and the reactor 112 generates more hydrogen gas, the burners 116a-d shift the composition of the gasses they combust. In some embodiments, the burners 116a-d stop combusting the reactant all together before, or as, the fourth reaction chamber 1312d reaches the operating temperature. Similarly, as more of the reaction chambers 1312 reach the operating temperature and the reactor 112 generates more hydrogen gas, the amount of the hydrogen gas diverted into the second hydrogen path 314 to be delivered outside of the reactor 112 can increase.

In some embodiments, the reactor 112 can include one or more thermal insulators (e.g., the chamber 1140 discussed above with respect to FIG. 11 and/or a mechanical actuator (not shown). The mechanical actuator can move the thermal insulator from one reaction chamber 1312 to the next during the reheating process. Once applied to one reaction chamber 1312, the thermal insulators can reduce the parasitic heat losses from the reaction chambers 1312 to accelerate the reheating process. Once an individual reaction chamber 1312a-d is at the operating temperature, the thermal insulator(s) can be removed, and the parasitic heat losses can be captured elsewhere in the system 100 (FIG. 1). In some embodiments, the thermal insulators can remain over the reaction chambers 1312 even after they reach the operating temperature.

In some embodiments, the reactor 112 turns off one or more of the reaction chambers 1312 as the demand for hydrogen gas and/or electricity decreases. For example, for periods of lower demand, the reactor 112 can operate the first and second reaction chambers 1312a, 1312b and allow the third and fourth reaction chambers 1312c, 1312d to cool. In some embodiments, each of the reaction chambers 1312a-d is thermally coupled to utilize parasitic heat loss from one reaction chamber 1312 to heat another reaction chamber 1312. For example, after the first reaction chamber 1312a is at the operating temperature, the parasitic heat loss from the first reaction chamber 1312a can be directed to the second-fourth reaction chambers 1312b-d to partially reheat the second-fourth reaction chambers 1312b-d.

In some embodiments, the reactor system 110 (FIG. 1) can avoid the reheating process by maintaining the reactor 112 near the operating temperature, even during periods of low (or no) demand. In various embodiments, the reactor 112 can operate continuously to generate hydrogen gas continuously and/or by modulating the input flow of reactant according to demand but maintaining the temperature of the reactor 112. In continuous operation embodiments, the reactor 112 uses the hydrogen gas to maintain heat according to normal operation. Excess hydrogen gas and/or power, by virtue of the low demand, can be stored or distributed in a local grid. For example, the controller 150 (FIG. 1) can directing electricity into the energy grid to offset and/or address the costs of continuously operating the reactor 112. In another example, excess energy can be stored in a secondary cell to supplement the output from the reactor 112 when demand exceeds the reactor's output capabilities.

In embodiments that modulate the input flow of the reactant, the controller 150 (FIG. 1) can be used to measure, respond to, and/or predict demand, then control the input flow to meet the demand. For example, the controller 150 can determine that demand increases every day around 5:00 PM and can increase the input flow at or near 5:00 PM to meet the demand. During periods of low (or no) operation, the temperature of the reactor 112 can be maintained by the chamber 1140 discussed above with respect to FIG. 11, the reheating system 1240 discussed above with respect to FIG. 12, and/or any other suitable component. For example, the reactor 112 can constantly operate a pilot flame or another electric heater that counterbalances the heat lost from the reactor 112. In some embodiments that modulate the input flow of the reactant, the heat lost from the reactor 112 can be at least partially recovered using a thermal storage tank in thermal communication with the reactor 112.

As discussed above with reference to FIG. 1, further potential obstacles for the reactor 112 include adapting the reactor to meet size constraints imposed some residential and commercial building applications and efficiently coupling the reactor 112 to other components of the system 100, given the size constraints. Accordingly, in some embodiments, the reactor 112 can be integrated with one or more other components of the system 100 to achieve efficiencies in the operation of the system 100. That is, the placement of components of the system 100 within a shared space can improve the efficiency and/or operating costs of the system 100.

For example, the reactor 112 can be integrated with the power generator(s) 124 and/or the circulation system 130. The integrated components can share one or more heat inputs (e.g., share a single burner system) and/or directly use parasitic heat loss from one component to heat the other component. Further, the integrated components can more easily fit within the space constraints discussed above. For example, the integrated components can more easily fit within a space previously designated for another appliance, such as a traditional boiler or furnace.

The general use of compact heat-to electricity converters within residential heating appliances, such as furnaces, boilers, and hot water heaters, has been previously described in U.S. patent application Ser. No. 16/794,142 filed Mar. 12, 2019 by Ashton et. al, and incorporated herein by reference. However, several unique thermodynamic synergies are possible in the system 100 when the reactor 112 is integrated with other components of the system 100 in situ. For example, the overall exergy of the system 100 can be increased by adding a high temperature component, such as the reactor 112, directly upstream of, downstream of, and/or parallel to the power generator(s) 124. Heat not utilized by the power generator(s) 124 can be utilized by the reactor 112, or vice versa, to capture a larger fraction of the free energy content in the input reactant (e.g., in the methane input) before the heat is lost (e.g., degraded at an appliance's downstream heat exchanger). As a result, the efficiency of the integrated system 100 can exceed the efficiency of a system having the components operating separately.

In another example, the use of a hydrogen rather than natural gas in an appliance can help improve the efficiency of the heat transfer process from the flame to the power generator(s) 124. Further, hydrogen has a higher flame temperature, which also helps increase the efficiency of the power generator(s) 124 at a fixed heating demand. In addition, the availability of on-demand electricity and local electrical storage from other components in the system 100 can help enable various disclosed embodiments to address residential scale operational challenges of the reactor 112. For example, the local power generator(s) 124 can provide electrical heating to the reactor 112 (e.g., in accordance with the embodiments discussed above with respect to FIGS. 11 and 12) and/or can operate electrically driven valves or actuators of the reactor 112.

FIG. 14 is a schematic diagram of the reactor system 110 coupled to the electric generation system 120 in accordance with some embodiments of the present technology. In the illustrated embodiment, the system includes two reactors 112 and two power generators 124 that are arranged in parallel. In the illustrated embodiment, the reactors 112 are each placed adjacent the burner 116, alongside a hot end 1426 of the power generators 124. In the parallel arrangement, heat from the burner 116 is transferred directly into each of the reactors 112 as well as directly into the hot end 1426 of each of the power generators 124. The heat transferred to the reactors 112 maintains the operating temperature of the reactors 112 to cause the pyrolysis reaction, thereby generating hydrogen gas. In some embodiments, at least a portion of the hydrogen gas is separated from carbon particulates in the carbon separator, then sent along the first hydrogen path 312 to the burner 116. In the illustrated embodiment, the hydrogen fuel supply for the burner 116 comes entirely from the first hydrogen path 312 and is mixed with air at the burner 116 to adjust the burn temperature of the hydrogen flame. In various other embodiments, the hydrogen fuel supply can be supplemented with hydrogen from a storage tank and/or with other fuels (e.g. natural gas).

Meanwhile, the heat transferred to the power generators 124 generates a temperature difference between the hot end 1426 of the power generators 124 and a cold end 1426 of the power generators 124. In the illustrated embodiment, the cold end of the power generators 124 is positioned within a chamber 1440 and separated from the hot end 1426 by a space 1427. The chamber 1440 thermally insulates the cold end 1428 of the power generators 124 from the reactors 112, while the space 1427 helps maintain a temperature difference between the hot end 1426 of the power generators 124 from the cold end 1428. The power generators 124 can then use the temperature difference to generate electricity in accordance with any suitable mechanism. For example, in some embodiments, the power generators 124 are thermionic converters with the hot end 1426 separated from the cold end 1428 by a vacuum (or partial vacuum,) or a suitable material in the space 1428. In such embodiments, the hot and cold ends 1426, 1428 can each be metal plates separated by the space 1427. When the hot end 1426 is heated to high temperatures, the heated metal's surface will emit electrons across the space 1427 to the cold end 1428, resulting in usable electrical energy. The thermionic converters can generate electricity from the heat from the burner without any moving parts in the power generators 124, thereby reducing maintenance and/or space requirements for the system 100. Heat that is not used by either the reactors 112 or the power generators 124 flows outwards along paths 1434, which can be directed to a sink and/or a heat exchanger in the circulation system 130 (FIG. 1).

Figure 15:
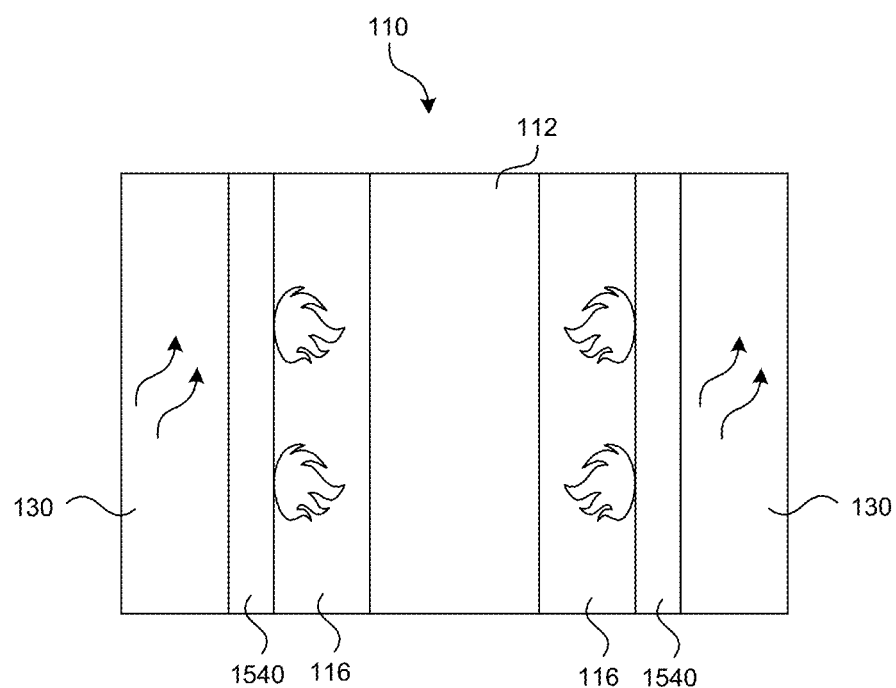
FIG. 15 is a schematic diagram of a reactor system coupled to a home heating system in accordance with some embodiments of the present technology.

FIG. 15 is a schematic diagram of the reactor system 110 coupled to the circulation system 130 in accordance with some embodiments of the present technology. In the reactor system 110, the reactor 112 receives heat from one or more burners 116 disposed on either side of the reactor 112. One or more insulating walls 1540 are positioned around the burners 116. The insulating walls 1540 restrict, or prevent, heat from the burners 116 from passing in any direction other than towards the reactor 112 to maintain the operating temperature of the reactor 112. The circulation system 130 is positioned around the insulation walls 1540 to capture heat that is not absorbed by the reactor 112 and/or parasitic heat loss from the reactor 112. Accordingly, heat that is not absorbed by the reactor 112 flows directly into the circulation system 130. The illustrated configuration of the reactor system 110 and the circulation system 130 can allow the system 100 (FIG. 1) to utilize all, or nearly all, of the heat generated by the burners 116.

In various other embodiments, the system 100 of FIG. 1 can include various other series arrangements between the components of the system 100. For example, in some embodiments, the reactor 112 and the power generator(s) 124 are arranged in series with the power generator(s) 124 positioned in close proximity to the burners 116 to directly receive heat. In some such embodiments, the reactor system 110 is positioned in between the power generator(s) 124 and a heat rejection loop for the power generator(s) 124. This series configuration is appropriate for embodiments in which the operating temperature of the power generator(s) 124 is higher than that of the reactor 112, such that the power generator(s) 124 have a higher demand for the heat from the burners 116 and enough excess heat is present to maintain the operating temperature of the reactor 112. By way of example only, some thermionic energy converters, thermophotovoltaics, and other high temperature heat engines are appropriate for this configuration. In another example, in some embodiments, the reactor 112 and the power generator(s) 124 are arranged in series, with the reactor system 110 positioned in close proximity to the burners 116 to directly receive heat. In some such embodiments, the power generator(s) 124 is positioned directly downstream to directly utilize heat emitted from the reactor system 110. This series configuration is appropriate for embodiments in which lower temperature power generator(s) 124 are utilized. By way of example only, some alkali-metal thermal-to-electric converters or Stirling engines where the heat engine is a bottoming cycle on the reactor 112 are appropriate for this configuration.

In other embodiments for which the thermodynamic synergy described above is not required, each of the components of the system 100 can be separate from the other components. Separately positioning the components can also help address the space requirements discussed above, allowing components of the system 100 to be fit into available spaces. That is, rather than requiring a space large enough for all the components of the system 100 together, the system 100 can be fit into corresponding individual spaces, and then be interconnected.

Figure 16:
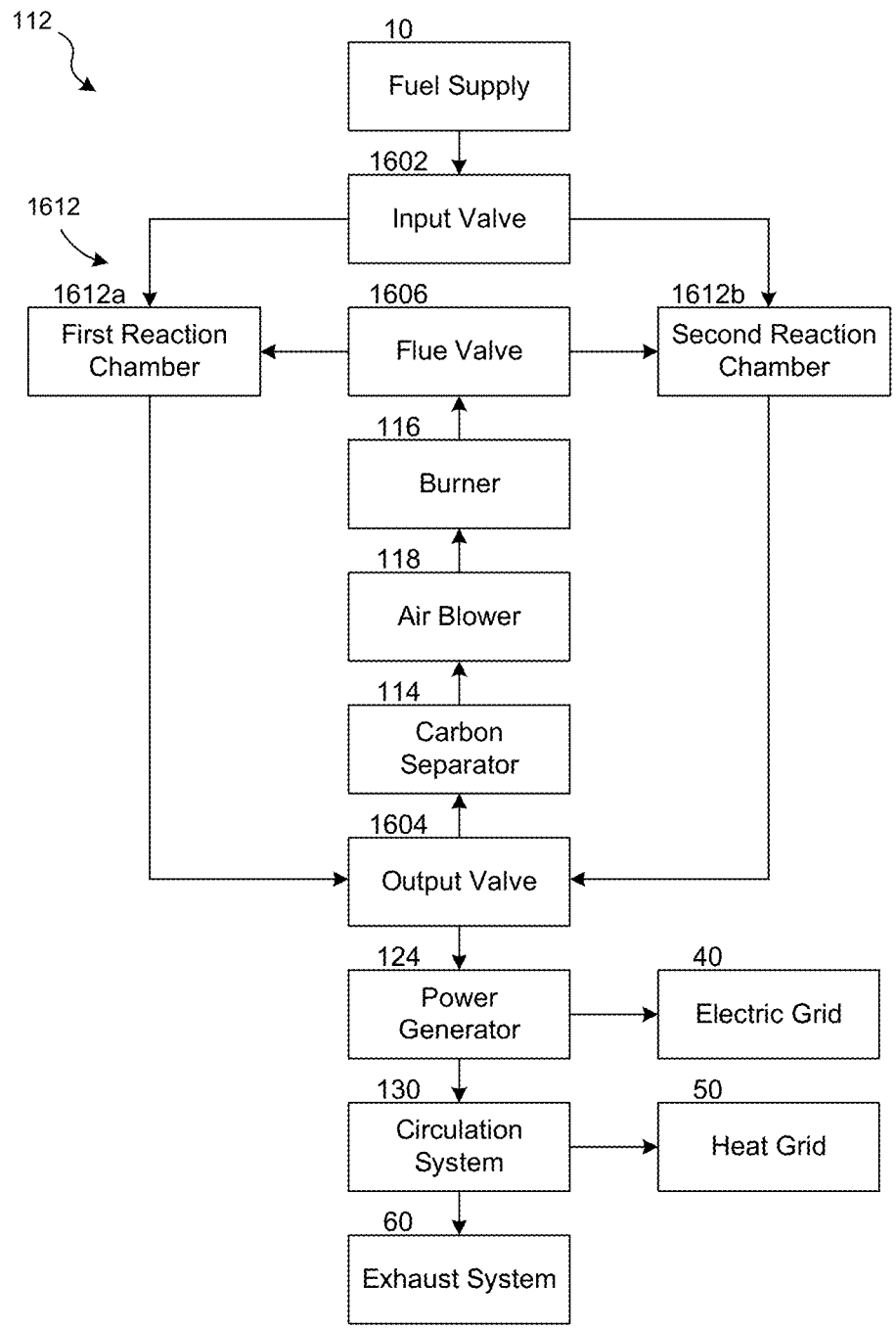
FIG. 16 is a block diagram of another reactor system for producing hydrogen gas in accordance with some embodiments of the present technology.

FIG. 16 is a block diagram of the flow of materials through a regenerative pyrolysis reactor 112 in accordance with further embodiments of the present technology. In the illustrated embodiment, the reactor 112 includes an input valve 1602 operably coupled to the fuel supply 10, two reaction chambers 1612 (referred to individually as first reaction chamber 1612a and second reaction chamber 1612b) operably coupled to the input valve 1602 and one or more output valves 1604 operably coupled to the reaction chambers 1612. Each of the reaction chambers 1612 can include a heat exchange material and one or more flow paths through the heat exchange material. In various embodiments, the heat exchange material can include cordierite, mullite, alpha alumina, and/or combinations thereof. Further, in some embodiments, each of the reaction chambers 1612 has a unitary and/or monolithic structure defined by the heat exchange material. As a reactant flows through one of the reaction chambers 1612, the heat exchange material heats the reactant above the enthalpy point for the pyrolysis reaction, thereby causing hydrocarbons in the reactant to break down into hydrogen gas and carbon particulates. The hydrogen gas can then be used to generate heat and/or electricity. In some embodiments, for example, the hydrogen gas is burned to preheat and/or maintain the heat of the reaction chambers 1612. In some embodiments, as discussed in more detail below, the reactor 112 operates in a cyclical manor.

For example, during a first time period, the input valve 1602 can direct a reactant into the first reaction chamber 1612a. The first reaction chamber 1612a can cause the pyrolysis reaction, thereby breaking the reactant down into carbon particulate and hydrogen gas. The output valve 1604 can then direct at least a portion of the output from the first reaction chamber 1612a towards the carbon separator 114, the air blower 118, and the burner 116. As described above, the carbon separator 114 can remove the carbon particulates from the flow of hydrogen gas, the air blower 118 can mix the hydrogen gas with oxygen, and the burner 116 can combust the hydrogen with the oxygen. A flue valve 1606 can then direct the resulting hot flue gas into and/or around the second reaction chamber 1612b to heat the second reaction chamber 1612b. In some embodiments, the hot flue gas causes carbon within the second reaction chamber 1612b to combust, further delivering heat to the second reaction chamber 1612b. The output valve 1604 can direct the hot flue gas flowing out of the second reaction chamber 1612b towards the power generator 124 and/or the circulation system 130. The power generator 124 can use the hot flue gas to generate and output electricity into the electric grid 40, while the circulation system 130 can use the hot flue gas to output heat into the heating grid 50. Any remaining flue gas is then emitted though the exhaust system 60.

During a second time period, the flow can be reversed through the valves 1602, 1604, and 1606 to utilize the heat transferred into the second reaction chamber 1612b to cause the pyrolysis reaction and to reheat the reaction chamber 1612a. That is, the input valve 1602 directs the reactant into the second reaction chamber 1612b, the output valve 1604 directs at least a portion of the hydrogen gas from the second reaction chamber 1612b towards the burner 116, the flue valve 1606 directs the hot flue gas into and/or around the first reaction chamber 1612a, and the output valve 1604 directs the hot flue gas from the first reaction chamber 1612a towards the power generator 124 and/or the circulation system 130.

In some embodiments, the reactor 112 cycles the reaction chambers 1612 between an active stage and a preheating stage (e.g., by switching from directing the reactant in to the first reaction chamber 1612a and the second reaction chamber 1612b) after a suitable amount of time. For example, in various embodiments, the reactor 112 can cycle between the reaction chambers 1612 every minute, every two minutes, every ten minutes, every thirty minutes, or after any other suitable period. In some embodiments, the reactor 112 cycles between the reaction chambers 1612 when the temperature in the active reaction chamber (e.g., the reaction chamber causing the pyrolysis reaction) falls below a predetermined point. The predetermined point can be selected to help ensure the reactant sufficiently reacts while in the active reaction chamber. Below the predetermined point, the reactant may not react fast enough within the active reaction chamber and/or may not react at all. In various embodiments, the reactor 112 can cycle between the reaction chambers 1612 when the temperature in the active reaction chamber falls below about 1200° C.

In some embodiments, the inputs and outputs of the reaction chambers 1612 can be connected to the valves 1602, 1604, and 1606 by a piping system and the valves 1602, 1604, and 1606 can be coupled to actuators to toggle the valves 1602, 1604, and 1606 to direct the flow of fluids through the pipes. Accordingly, the reactor 112 can cycle between the reaction chambers 1612 by instructing the switches 1602, 1604, and 1606 to toggle the valves. As a result, the reactor 112 can cycle between the reaction chambers 1612 in a fast, efficient manner, depending on the time it takes the valves. In various embodiments, the reactor 112 can cycle between the reaction chambers 1612 in less than a minute, less than thirty seconds, less than ten seconds, or nearly instantaneously. In some embodiments, each of the valves 1602, 1604, and 1606 can toggle corresponding valves simultaneously. In some embodiments, one or more of the valves 1602, 1604, and 1606 can toggle corresponding valves sequentially. For example, the output valve 1604 can toggle a corresponding valve after all of the hydrogen gas from the active reaction chamber is be directed to the appropriate destination.

In some embodiments, the output valve 1604 directs a portion of the hydrogen gas from the active reaction chamber away from the reactor 112. For example, the hydrogen gas can be directed to the power generator 124 to produce electricity and/or to a hydrogen storage. In some embodiments, the stored hydrogen gas can later be used to heat one or more of the reaction chambers 1612. In some such embodiments, the use of stored hydrogen allows the reactor 112 to cool between periods of high use without requiring another source of energy (e.g., heat and/or electricity) to restart the reactor 112.

In some embodiments, the reactor 112 can include one or more additional components and/or an alternative arrangement of one or more of the components discussed above. In some embodiments, for example, the carbon separator 114 positioned can be between the reaction chambers and the output valve 1604. In some embodiments, the reactor 112 can include multiple output valves 1604, multiple carbon separators 114, and/or multiple burners 116. Further, in some embodiments, one or more of the components of the reactor 112 are combined. For example, the burner 116 can be integrated with the air blower 118 in a single component. In another example, one or more of the valves 1602, 1604, and 1606 can be combined in a single component. In some embodiments, the reactor 112 can include more than two reaction chambers 1612, such as three, four, five, ten and/or any other suitable number of reaction chambers 1612. In some such embodiments, two or more reaction chambers 1612 are active (e.g., used to heat the reactant) during operation of the reactor 112. In some such embodiments, two or more reaction chambers 1612 are preheating during operation during operation of the reactor 112.

Figure 17A:
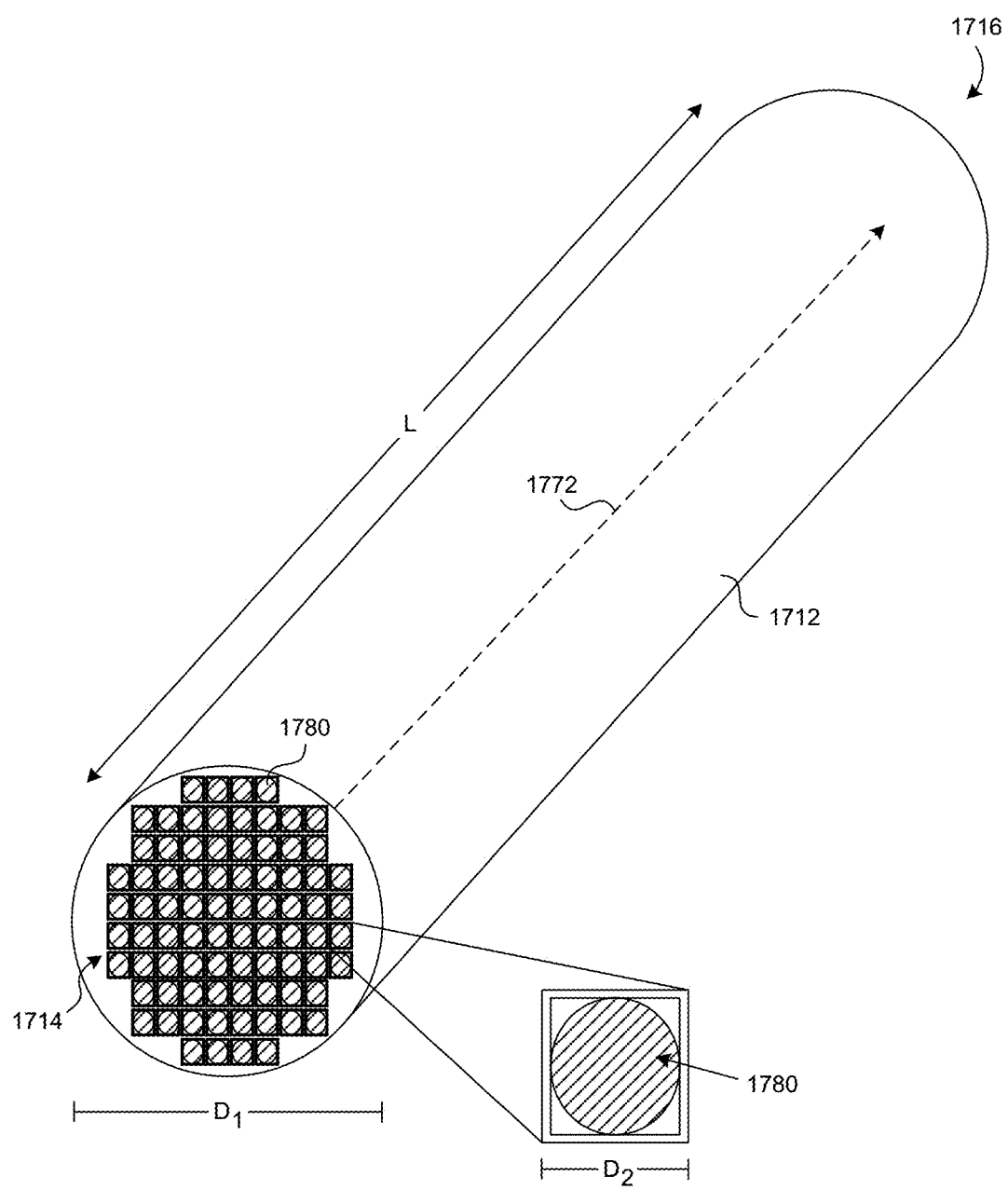
FIG. 17A is a schematic diagram of a reaction chamber for use in the reactor system of FIG. 16 in accordance with some embodiments of the present technology.

FIG. 17A is a partially schematic diagram of a reaction chamber 1712 for use in the reactor 112 of FIG. 16 in accordance with some embodiments of the present technology. In the illustrated embodiment, the reaction chamber 1712 includes multiple flow channels 1780 extending from a first end 1714 of the reaction chamber 1712 to a second end 1716 of the reaction chamber 1712 opposite the first end 1714. Together, the flow channels 1780 define a pathway 1772 through the heat exchange material of the reaction chamber 1712. Accordingly, during operation, the reactant can flow into the flow channels 1780 at the first end 1714, down the pathway 1772, and out of the flow channels 1780 at the second end 1716. The reaction chamber 1712 can transfer heat to the reactant traveling along the pathway 1772, thereby causing the pyrolysis reaction to occur.

In the illustrated embodiment, the reaction chamber 1712 has a circular tube shape. In various other embodiments, the reaction chamber 1712 can have other shapes, such as square, rectangular, hexagonal, and/or other tubular shapes, a coil or other non-axial shape, and/or any other suitable shape. Similarly, in illustrated embodiment, each of the flow channels 1780 has a circular tube shape. In various other embodiments, the flow channels 1780 reaction chamber 1712 can have other shapes, such as square, rectangular, hexagonal, and/or other tubular shapes, coils, and/or any other suitable shape. The reaction chamber 1712 can be produced by various known manufacturing techniques applied to the desired structure. For example, the reaction chamber 1712 can be produced by an additive manufacturing process (e.g., three-dimensional printing), a die process, molding process, an extrusion process, and/or any combination of the manufacturing techniques.

As illustrated in FIG. 17A, the reaction chamber 1712 has with a length L corresponding to the length of the pathway 1772 and a diameter $D_1$. As further illustrated, each of the flow channels 1780 has a diameter $D_2$. The length L, diameter $D_1$, and diameter $D_2$ can each vary based on a desired output capability for the reaction chamber 1712, size requirements for the space the reactor 112 (FIG. 16) will be integrated into, and/or preferred operating conditions for the reaction chamber 1712. Further, the dimensions can be interdependent. For example, the diameter $D_1$ can be set according to the diameter $D_2$ and a desired channel density. In another example, the length L can partly depend on the diameter $D_2$ to help ensure a reactant flowing through the flow channels 1780 reaches the enthalpy point within the reaction chamber 1712. In various example embodiments, the length L of the reaction chamber 1712 can range from about 0.5 meters (m) to about 10 m; the diameter $D_1$ of the reaction chamber 1712 can range from about 0.1 m to about 1 m; the diameter $D_2$ of the flow channels can range from about 0.01 centimeters (cm) to about 1 m; and/or the channel density can range from about 1 channel per square inch (CPI) to about 500 CPI. In one embodiment, for example, the length L of the reaction chamber 1712 is about 1 m, the diameter $D_1$ of the reaction chamber 1712 is about 1.3 cm, the diameter $D_2$ of the flow channels is about 0.635 cm, and the channel density is about 4 CPI.

Additional details on how each of the dimensions can be impacted by operational considerations is set out below. One of skill in the art will understand that the example operational conditions discussed below are examples only, and that the reactor can have various other suitable operational considerations to meet the output demands discussed above. For example, although the reaction chamber 1712 is discussed with reactant input flow rates of 1 standard liter per minute (SLPM) and 5 SLPM are discussed below, the reaction chamber 1712 can have any other suitable reactant input flow rate.

One consideration for the reaction chamber dimensions is the ability of the reaction chamber 1712 to heat the incoming reactant above a desired reaction temperature (e.g., above the enthalpy point or well-above the enthalpy point). For example, for a given heat transfer material, a given temperature of the reaction chamber, and a given Surface to Volume (S/V) ratio for the flow channel 1780 (defined by the diameter $D_2$ of the flow channel 1780), the reaction chamber 1712 transfers the heat to the incoming reactant at a rate R1. At the heat transfer rate R1, a specific induction time (e.g., the time to heat the reactant above the desired temperature) and a residence time (e.g., reaction time) is required to convert the hydrocarbons in the incoming reactant into hydrogen and carbon via the pyrolysis reaction. Accordingly, at the heat transfer rate R1, the reactant can have a total time requirement to reach a desired extent of conversion in the pyrolysis reaction (e.g., a desired percent of hydrocarbons decomposed). In turn, the length L of the reaction chamber 1712 and/or input flow rate of the reactant can be varied to satisfy the total time requirement. Additionally, or alternatively, the S/V ratio can be selected for a set length L to satisfy the total time requirement. In some embodiments, the desired operating temperature can be from about 1200° C. to about 1600° C. In some such embodiments, the residence time required to convert all, or almost all, of the hydrocarbon into hydrogen gas and carbon is on the scale of seconds, including less than one second. In one embodiment, for example, the operating temperature can vary from about 1200° C. to about 1400° C. in a reactor having an inlet flow rate of about 5 SLPM and a diameter $D_2$ of the flow channels of about 1.3 cm, resulting in an induction time of about 0.27 seconds, and a residence time of about 0.38 seconds. For a reaction chamber with a length L of about 1 m, about 90% of the reactant will be converted within the reaction chamber.

Figure 18:
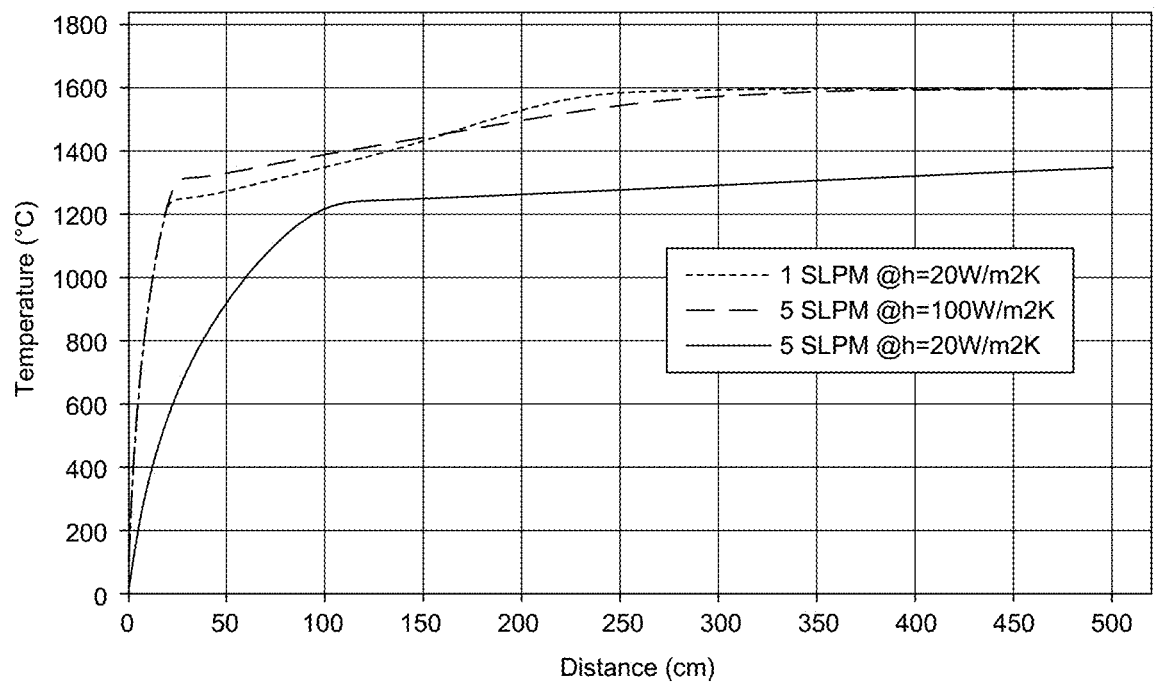
FIG. 18 illustrates a relationship between the length of a reaction chamber and the temperature of the reactant flowing through the reaction chamber for various flow rates in accordance with some embodiments of the present technology.

FIG. 18 illustrates an example of the relationship between the length of the reaction chamber 1712 and the temperature of the reactant flowing through the reaction chamber 1712 for various input flow rates and varying heat transfer rates. As illustrated, at a first heat transfer rate of 20 watts per meter-squared-Kelvin (W/m$_2$K) and an input flow rate of the reactant of 1 SLPM, the reactant increases in temperature by 1200° C. over a length L of about 40 cm. In contrast, at the first heat transfer rate and an input flow rate of the reactant of 5 SLPM, the reactant increases in temperature by 1200° C. over a length L of about 100 cm. In further contrast, at the input flow rate of the reactant of 5 SLPM and a second heat transfer rate of 100 W/m$_2$K, the reactant increases in temperature by 1200° C. over a length L of about 40 cm. For various embodiments, the inventors have determined that for an input flow rate of varying from about 1 SLPM to about 5 SLPM, a diameter $D_2$ of the flow channels 1780 ranging from about 0.5 cm to about 5 cm, and a desired operating temperature increase of about 1000° C., the required length L can vary from about 0.05 m to about 1.3 m.

In some embodiments, the size of the reaction chamber 1712 can be further reduced by preheating the reactant before it enters the reaction chamber 1712. For example, in some embodiments, the reactant is preheated to a temperature of about 500° C. before the reactant enters the reaction chamber 1712. In some embodiments, the reactant is preheated using the hot outputs flowing out of the active reaction chamber and/or the preheating reaction chamber. For example, an input line for the reactant can include coils that wrap around the output from the active reaction chamber to simultaneously cool the output and preheat the reactant. In another example, as discussed above with respect to FIG. 16B, the input line for the reactant can include coils that wrap around the output from the preheating reaction chamber to simultaneously cool the flue gas and preheat the reactant.

Another consideration for the dimensions of the reaction chamber is the ability of the reaction chamber 1712 to withstand continuous and/or extended operation. One limitation on such operation, is that the heat exchange materials in the reaction chamber 1712 cannot withstand relatively high pressure drops between the flow channels 1780 at high temperatures (e.g., greater than 1000° C.). Accordingly, the dimensions and the predetermined operating conditions of the reaction chamber 1712 can be selected at least in part based on the expected pressure drop across the flow channels 1780 during operation.

For example, the pressure drop across the flow channels 1780 is dependent on the gas or fluid flow of the reactant, the channel diameter $D_2$, and the channel length (e.g., the length L of the reaction chamber 1712). Accordingly, in some embodiments, the diameter $D_2$ of the flow channels 1780 and/or the length L of the reaction chamber 1712 can be selected to account for the pressure drop across the flow channels 1780. For example, the inventors have determined that for a reaction chamber 1712 with a length L of about 5 m, a flow channel diameter $D_2$ of between about 0.5 cm to about 1.5 cm, a reactant input flow rate between about 1 SLPM and about 5 SLPM, and an operational temperature of about 1500° C., the pressure drop is less than about 1 pounds per square inch (psi), which is within an acceptable range.

Further, in some embodiments, carbon material deposited on the surface walls of the flow channel 1780 (also referred to as "fouling") can partially (or fully) clog the flow channels 1780 during operation. The reduction in the flow channel diameter $D_2$ due to fouling can affect the dimensions of the reaction chamber 1712 selected to meet the pressure drop requirements. For example, carbon particulates can be produced in the reaction chamber 1712 as a result of heterogenous and/or homogenous pyrolysis reactions. Heterogeneous reactions based on interactions between the reactant and the hot surface or wall of the reaction chamber 1712. In contrast, homogenous reactions occur in the gas phase of the reactant, leading to nucleation and growth of carbon particulates in the gaseous reactant. Carbon particulates produced via homogenous reactions are carried by the gas flow to the second end 1716 of the reaction chamber 1712. Once out of the reaction chamber 1712, the carbon particulates can be collected by a carbon separator, such as a series of cyclones and/or carbon filters. Carbon particulates produced via heterogenous reactions often remain within the flow chamber of the reaction chamber 1712, thereby fouling the flow channels 1780 over time. The ratio of heterogenous reactions and homogenous reactions is affected by the S/V ratio in the flow channels 1780 (determined by the diameter $D_2$ of the flow channels 1780) and the reactant's contact time with the walls of the reaction chamber 1712. Accordingly, in some embodiments, the diameter $D_2$ of the flow channels 1780 is selected to maximize the amount of the pyrolysis reaction that occurs as a homogenous reaction.

Figure 19:
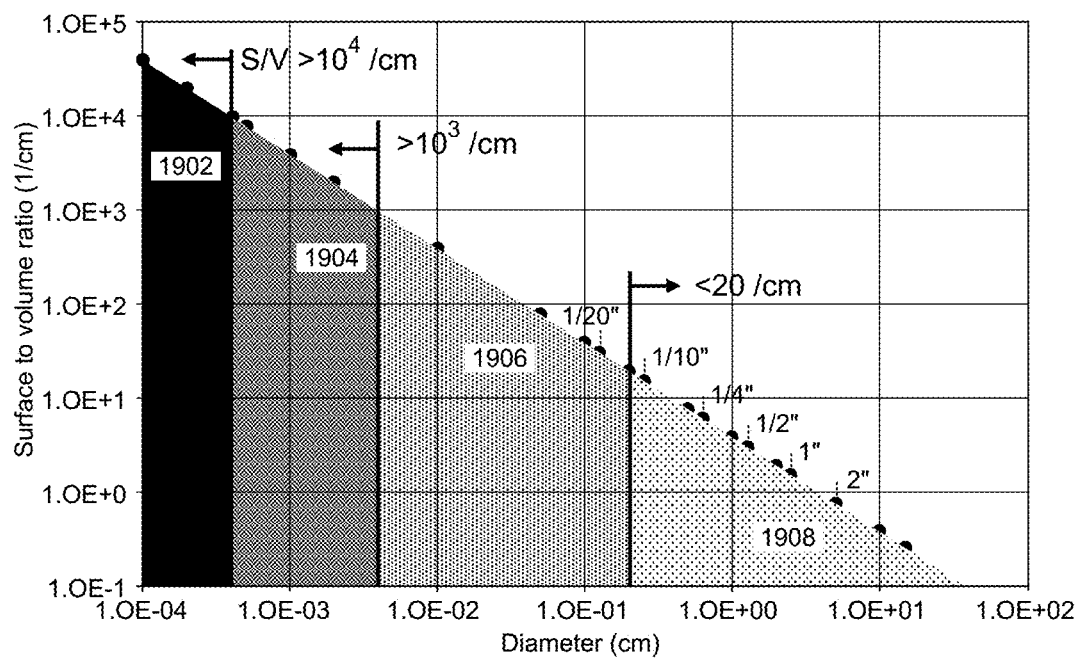
FIG. 19 illustrates an effect of the relationship between the surface to volume ratio and the diameter of a flow chamber on the reaction within a reaction chamber in accordance with some embodiments of the present technology.

FIG. 19 illustrates an effect of the relationship between the S/V ratio and the diameter $D_2$ of a flow channel 1780 on the type of reaction within the reaction chamber 1712 of FIG. 17 for a given input flow rate. In the illustrated relationship, the first region 1902 corresponds to an S/V ratio of between about 10,000/cm and about 1000/cm. In the first region 1902, the pyrolysis reaction is entirely (or almost entirely) a heterogenous reaction. The second region 1904 corresponds to an S/V ratio of between about 1000/cm and about 100/cm. In the second region 1904, the pyrolysis reaction is primarily a heterogenous reactions, with some homogenous reactions beginning to occur. The third region 1906 corresponds to an S/V ratio of between about 100/cm and about 20/cm. In the third region 1906, the pyrolysis reaction is primarily a homogenous reaction, with some remaining heterogenous reactions. The fourth region 1908 corresponds to an S/V ratio of less than about 20/cm. In the fourth region 1908, the pyrolysis reaction is entirely (or almost entirely) a homogenous reaction. Accordingly, in some embodiments, the flow channel diameter $D_2$ can be selected within the fourth region 1908, and therefore have of a diameter $D_2$ about 0.2 cm or above. In such embodiments, fouling can play a minimal role in the pressure drop between flow channels.

Figure 20:
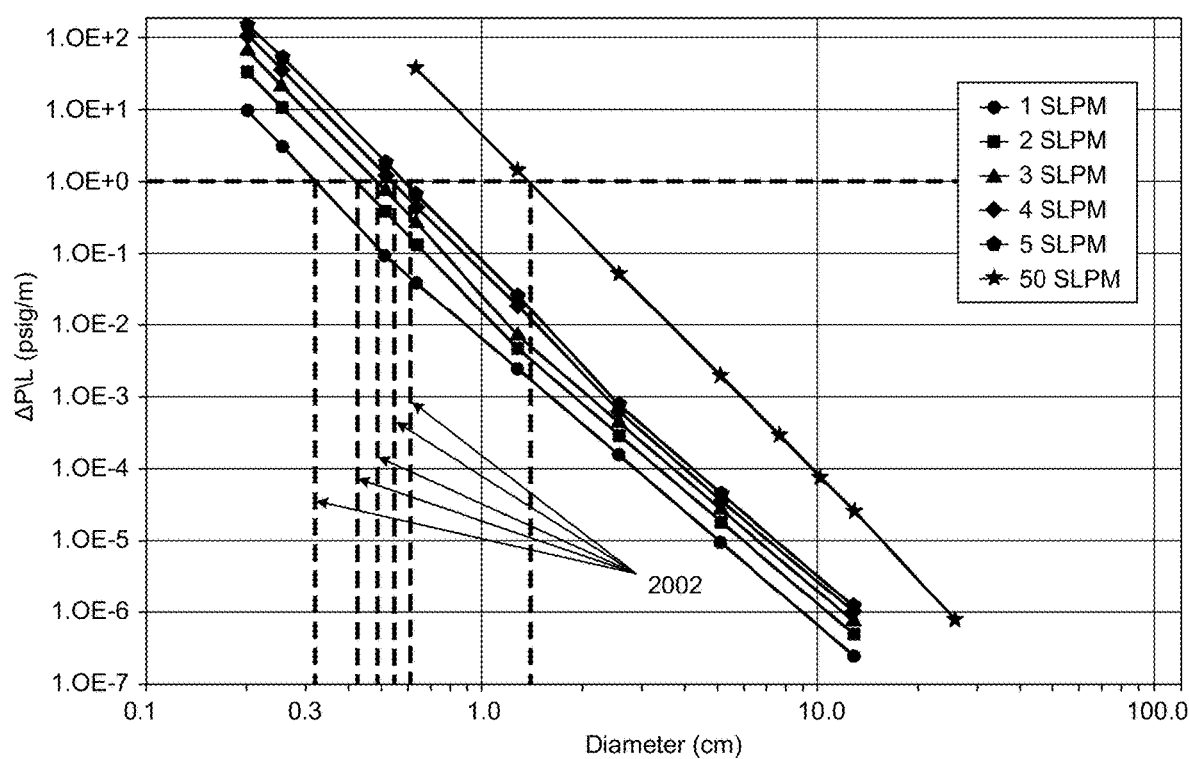
FIG. 20 illustrates representative dimensions for the reaction chamber that satisfy homogenous reaction conditions for a maximum pressure drop across the reactor in accordance with some embodiments of the present technology.

Further, the inventors have determined that the pressure drop for flow channels in the region 1908 all satisfy the pressure drop requirements discussed above (e.g., having less than 1 psig/m pressure drop). For example, FIG. 20 illustrates a relationship between the diameter $D_2$ and the pressure drop across the flow channels for various input flow rates. In FIG. 20, the minimum diameter to remain below 1 psig/m pressure drop indicated by lines 2002. For example, for an input flow rate of 1 SLPM, the minimum diameter indicated by line 2002 is about 0.3 cm. In another example, for an input flow rate of 50 SLPM, the minimum diameter indicated by line 2002 is about 1.1 cm. As indicated by each of the lines 2002, the minimum diameter for each input flow rate is above the 0.2 cm for the region 1908 discussed above with respect to FIG. 19. Accordingly, diameters that satisfy the pressure drop requirements for a 1 psig/m pressure drop will also result in almost entirely homogenous reactions, thereby avoiding pressure drop concerns from fouling.

Figure 17B:
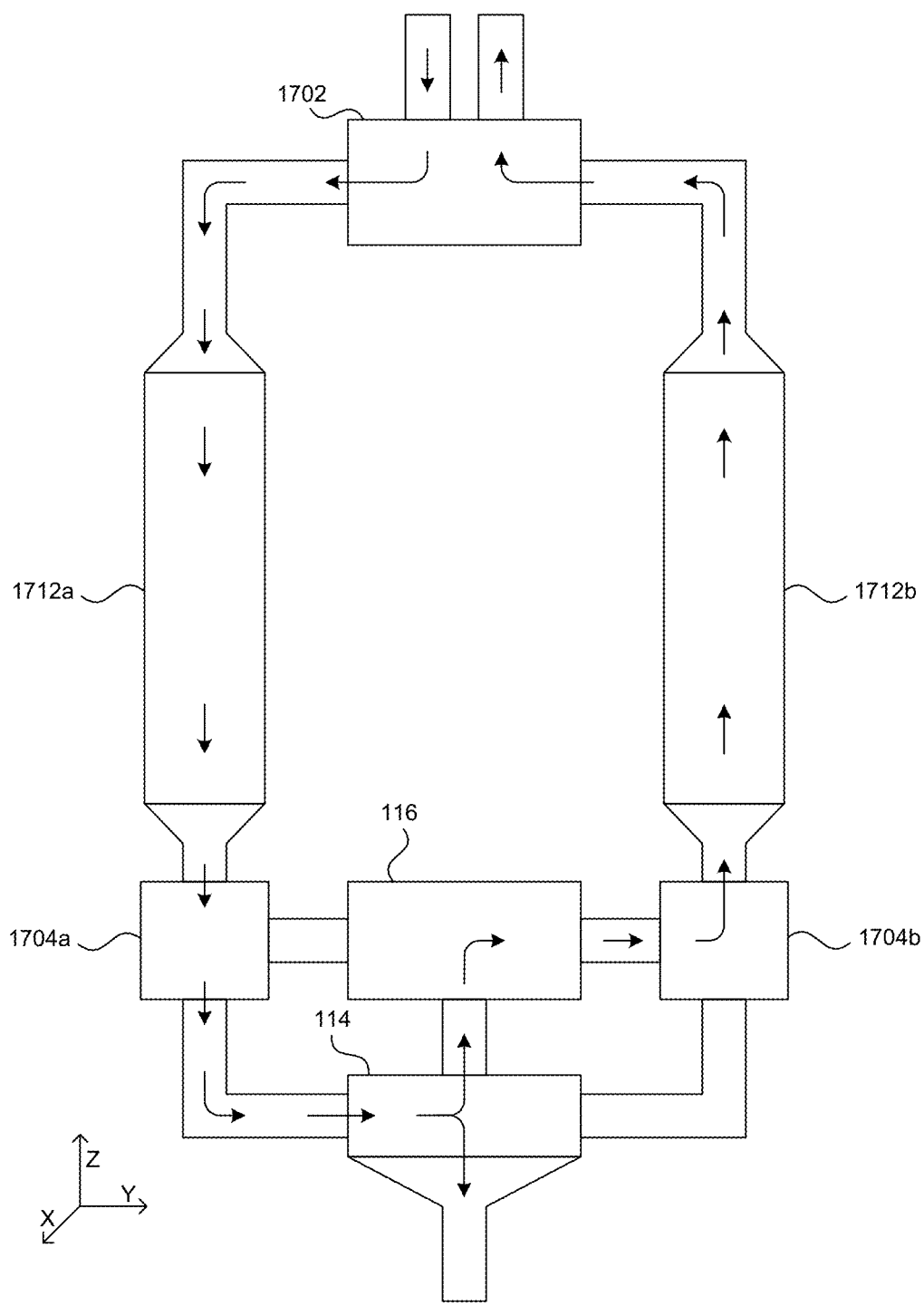
FIG. 17B is a schematic diagram the reactor system of FIG. 16 having multiple reaction chambers in accordance with some embodiments of the present technology.

FIG. 17B is a partially schematic diagram a reactor 112 of the type illustrated in FIG. 16A in accordance with some embodiments of the present technology. For example, in the illustrated embodiment, the reactor 112 includes the input valve 1702, the two reaction chambers 1712, two output valves 1704 (referred to individually as a first output valve 1704a and a second output valve 1704b), the carbon separator 114 and the burner 116. In FIG. 17B, the flow of materials through the reactor 112 is indicated by arrows for a first time period, generally in the same manner discussed above with respect to FIG. 16. However, in the illustrated embodiment, the output valves 1704 have been combined with the flue valve 1606 (FIG. 16) to operate in conjunction. For example, the first output valve 1704a directs the output from the first reaction chamber 1712a into the carbon separator 114 and the burner 116, while the second output valve 1704b directs the flue gas from the burner 116 into the second reaction chamber 1712b. During a second time period, the flow of fluids through the reactor 112 is reversed. During the second time period, the second output valve 1704b directs the output from the second reaction chamber 1712b into the carbon separator 114 and the burner 116, while the first output valve 1704a directs the flue gas from the burner 116 into the first reaction chamber 1612a.

As further illustrated in FIG. 17B, the reaction chambers 1712 of the reactor 112 can be oriented in a vertical direction (e.g., along the z-axis). The vertical orientation can help avoid effects from fouling by utilizing gravity to help carry carbon particulates out of the reaction chambers 1712. The help from gravity to remove the carbon particulates can be important because the carbon particulates can change the effective fluid density and/or velocity, and therefore the fluid's ability to carry carbon out of the reactor even if the carbon is formed entirely by homogenous reactions. The inventors have determined that, for reaction chambers 1712 with a superficial gas velocity from about 1 meter per second (m/s) to about 30 m/s, an operating temperature of about 1400° C., and near 100% pyrolysis for a $CH_4$ molecule, the reaction chambers 1712 will need to be able to remove about 268 grams per cubic meter ($g/m^3$) to avoid any fouling effects. The inventors have also determined that reaction chambers 1712 with a diameter $D_2$ of the flow channels 1708 (FIG. 17A) between about 1 cm to about 5 cm and a vertical orientation, the carbon particulates will stabilize the flow of gas through the reaction chambers 1712 and will be removed from the reaction chambers 1712 by the flow of materials therethrough. Further, it is believed that for the diameter $D_2$ of the flow channels 1708 (FIG. 17A) between about 1 cm to about 5 cm, the carbon will be completely removed from the reaction chambers 1712 even for a horizontal reactant flow and/or a vertically-upward reactant flow. Further, the inventors have determined that for flow channels 1708 having a larger diameter $D_2$, the pressure drop will be lower. Accordingly, for such flow channels 1708, the inventors have determined that larger flow rates are possible while avoiding the pressure drop concern.

As further illustrated in FIG. 17B, the input valve 1702 can act as an output valve for the preheating reaction chamber (e.g., the second reaction chamber 1712*b* in the illustrated flow) to direct hot flue gasses out of the reactor 112. In some embodiments, accordingly, the input valve 1702 can include input coils wrapped around output channels from the reaction chambers 1712 to use heat from the hot flue gas to preheat the reactant flowing into the reactor 112. Further, in some embodiments, the output line from the reactor can be positioned adjacent the input line to the reactor, also allowing the hot flue gasses to preheat reactant flowing into the reactor 112.

Figure 21:
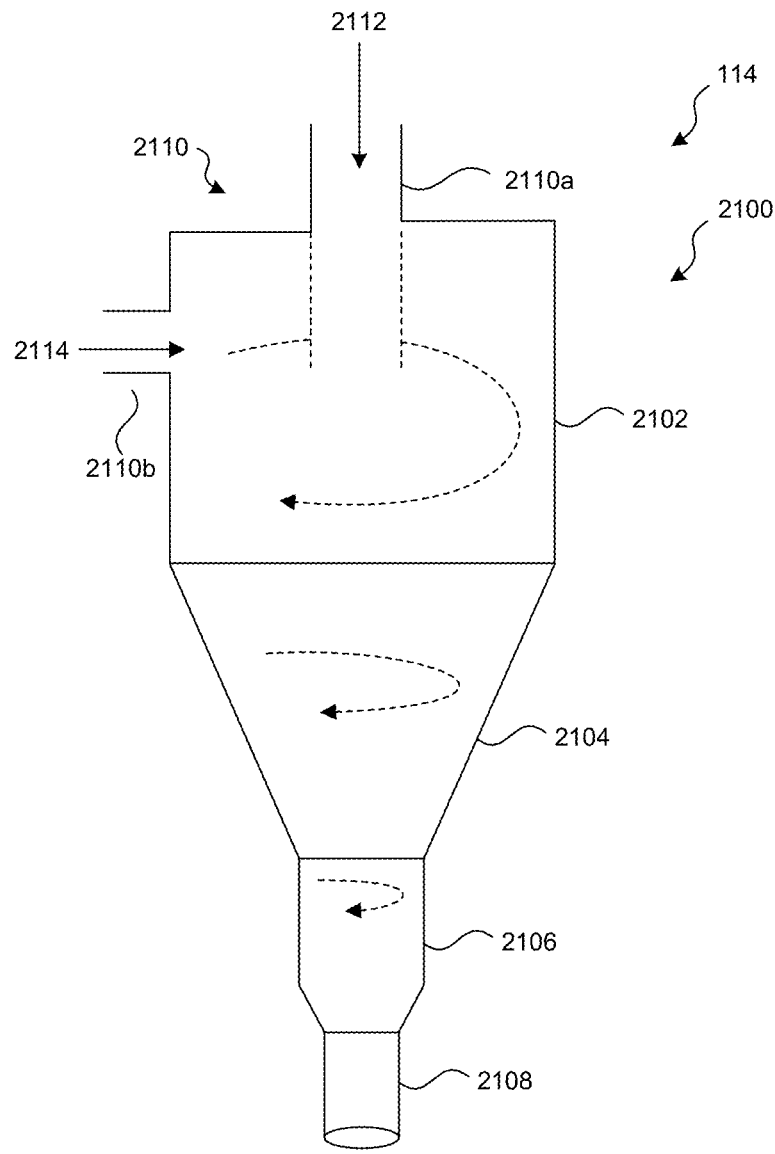
FIG. 21 is a schematic illustration of a cyclone separator for separating carbon from hydrogen gas in accordance with some embodiments of the present technology.

FIG. 21 is a schematic illustration of a cyclone separator 2100 that can be utilized in the carbon separator 114 in accordance with some embodiments of the present technology. As illustrated in FIG. 21, the cyclone separator 2100 includes a main barrel 2102 in fluid communication with inlet tubes 2110 (referred to individually as a first inlet tube 2110*a* and a second inlet tube 2110*b*), a cone section 2104 in fluid communication with the main barrel 2102, a collection section 2106 in fluid communication with the cone section 2104, and a dipleg 2108 in fluid communication with the collection section 2106.

The first inlet tube 2110*a* can be in fluid communication with the outlet from any of the reactors discussed above to receive a mixture that includes carbon particulates and hydrogen gas along a reactor output path 2112. The second inlet tube 2110*b* can be connected to a catalyst vapor source to receive a catalyst vapor along a catalyst input path 2114. As illustrated in FIG. 21, the catalyst input path 2114 impacts the reactor output path 2112 within the main barrel 2102 to generate a downward moving cyclone within the cyclone separator 2100. In turn, the cyclone imparts a centrifugal force on the mixture of carbon particulates and hydrogen gas flowing therein. Based on the impact from this force and the difference in density between the hydrogen gas and carbon particulates, the mixture separates as it travels through the cyclone separator 2100. The tapered walls of the cone section 2104 maintain the speed of the cyclone and funnel the mixture towards the collection section 2106 and the dipleg 2108. Some, or all, of the carbon particulates are captured in the collection section 2106 and sent to a carbon disposal component 20 (FIG. 1) before the dipleg 2108 routes the resulting hydrogen gas elsewhere. In some embodiments, the cyclone separator 2100 captures carbon particulates with a diameter of about 10 micrometers (μm) or above. Carbon particulates with a diameter below about 10 μm can escape into the output from the cyclone separator 2100. Accordingly, in various embodiments, the carbon separator 114 can include a series of cyclone separators and/or other particulate capturing units, such as a wet scrubbing component, a baghouse filter, and/or an electrostatic precipitator, and/or another suitable component.

For example, the carbon separator 114 can include a baghouse filter operably coupled to the cyclone separator 2100 to capture additional carbon particulates from the mixture. Baghouse filters are a type of fabric filter air-material separator employed for particulate removal from manufacturing and other industrial operations to keep dust and solid particulates from escaping in the open environment. Baghouses utilize fabric filter bags and/or pleated filters arranged in rows and mounted vertically in a sheet metal housing. A dusty gas stream is moved by an air blower and drawn into the baghouse through a duct system. The gases in the stream then pass through the filters, while particles remain on the filter media surface, thus separating the particulates from the gasses. Over time, the dust begins to build up and form a filter cake on the filter surface. Accordingly, various cleaning systems can used to remove the dust from the filters and/or the filters can be manually emptied periodically. As applied in the carbon separator 114, the baghouse filter can receive a flow of hydrogen gas and carbon particulates. While the hydrogen gas can pass through the fabric filter, the carbon particulates can be caught by the filter.

Figure 22A:
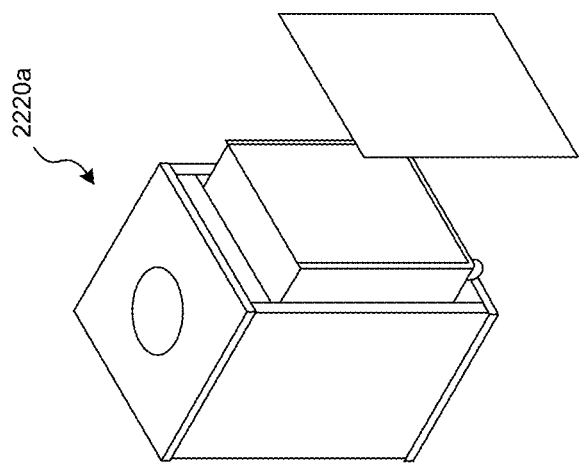
FIGS. 22A-C are partially schematic isometric views of carbon collection systems in accordance with various embodiments of the present technology.
Figure 22B:
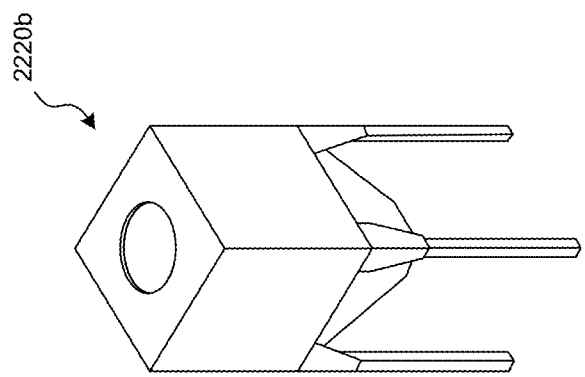
Figure 22C:
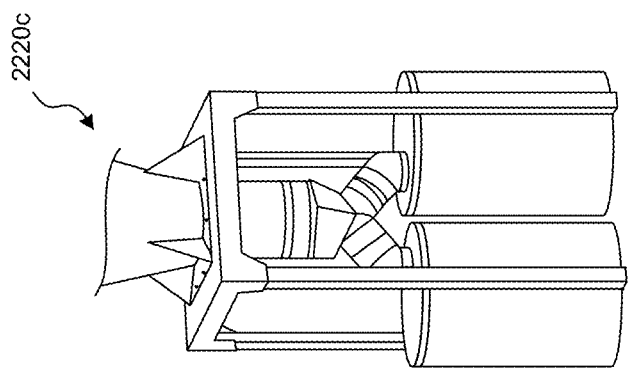

FIGS. 22A-C are partially schematic isometric views of carbon collection systems 2220A-2220C in accordance with various embodiments of the present technology. As illustrated, each of the carbon collection systems 2220A-2220C includes an inlet and a large storage area to collect carbon from the system 100 (FIG. 1). As illustrated in FIG. 22A, the carbon collection system 2220A can include a removable storage bin that can be periodically emptied and/or replaced. As illustrated in FIG. 22B, the carbon collection system 2220B can include a funnel leading to a lower opening that can allow carbon to be removed from the carbon collection system 2220B continuously and/or periodically. For example, a user can empty the carbon collection system 2220B through the opening once every week. As illustrated in FIG. 22C, the carbon collection system 2220C can include disposable storage tanks. For example, a user can periodically remove one (or both) of the storage tanks and replace them with empty storage tanks. The full storage tanks can then be taken elsewhere to be swapped for empty storage tanks and/or disposed.

Examples

Several examples of aspects of the present technology are described as numbered examples (1, 2, 3, etc.) below for convenience. These are provided as examples and do not limit the present technology. It is noted that any of the dependent examples can be combined in any suitable manner, and placed into a respective independent example. The other examples can be presented in a similar manner.

1. A system for producing hydrogen from natural gas, methane, or other available fuel gas at a scale consistent with the local distribution, consumption, or storage of hydrogen, the system comprising: a compact reactor for the conversion of gas into hydrogen and carbon and a separation system for the recovery or disposal of the carbon or other solid materials from the reactor.

2. The system of example 1, wherein the reactor includes a column of molten metal and wherein the metal includes a single chemical element or mixture of chemical elements.

3. The system of any of examples 1 and 2, wherein the conversion of the gas into hydrogen and carbon is done by passing the gas through a column of molten salt, which includes a single salt or mixture of different salts.

4. The system of any of examples 1-3, wherein the use or storage of hydrogen is integrated into the system.

5. The system of any of examples 1-4, wherein the hydrogen is transported to a location other than the one where it is generated for use or storage.

6. The system of any of examples 1-5, wherein the hydrogen generated is used to heat the vessel in which methane, natural gas, or other fuel gas is converted into hydrogen and carbon.

7. The system of any of examples 1-6, wherein the hydrogen and solid materials in the product stream are separated using a cyclone separator.

8. The system of any of examples 1-7, wherein the hydrogen and solid materials in the product stream are separated using multiple cyclone separators, to divide the solid materials based on particle size and/or density.

9. The system of any of examples 1-8, wherein the solid materials in the product stream are carried away from the reaction vessel by the flow of the gas products.

10. The system of any of examples 1-9, wherein the flow velocity of the product stream is increased by reducing the cross-sectional area of the reaction vessel near the exit, to allow the solid materials in the product stream to be carried away by the gas products.

11. The system of any of examples 1-10, wherein the hydrogen and solid materials in the product stream are separated using a combination of a cyclone separator and membrane separation.

12. The system of any of examples 1-11, wherein the hydrogen and solid materials are separated through controlled precipitation of carbon in the reaction vessel.

13. The system of any of examples 1-12, where solid materials are separated from the reaction vessel using a mechanical skimming device.

14. The system of any of examples 1-13, where solid materials are separated from the reaction vessel using transverse flow of gas.

15. The system of any of examples 1-14, wherein the hydrogen and solid materials in the product stream are separated using an electrostatic separator.

16. The system of any of examples 1-15, wherein the hydrogen and solid materials in the product stream are separated using filtration.

17. The system of any of examples 1-16, wherein the reaction vessel is replaced periodically to remove solid materials.

18. The system of any of examples 1-17, where only a fraction of the gas is converted into hydrogen and carbon.

19. The system of any of examples 1-18, wherein the carbon or other solid materials are disposed on site.

20. The system of any of examples 1-19, wherein the carbon or other solid materials are removed from the system and taken off site.

21. A system which produces hydrogen from natural gas, methane, or other available fuel gas at a scale consistent with residential use, the system comprising: a compact reactor for the conversion of the gas into hydrogen and carbon; a separation system for the recovery or disposal of carbon or other solid material from the reactor; and an appliance which utilizes the produced hydrogen for water or space heating.

22. The system of any of examples 21-, wherein the heating appliance is chosen from a furnace, boiler, or water heater.

23. A system of example 22 wherein the combustor in the heating appliance is used to provide the heat of reaction for the reactor.

24. The system of any of examples 21-23, wherein the reactor includes a column of molten metal and wherein the metal includes a single chemical element or mixture of chemical elements.

25. The system of any of examples 21-24, wherein the conversion of the gas into hydrogen and carbon is done by passing the gas through a column of molten salt, which includes a single salt or mixture of different salts.

26. The system of any of examples 21-25, wherein the use or storage of hydrogen is integrated into the system.

27. The system of any of examples 21-26, wherein the hydrogen is transported to a location other than the one where it is generated for use or storage.

28. The system of any of examples 21-27, wherein the hydrogen generated is used to heat the vessel in which methane, natural gas, or other fuel gas is converted into hydrogen and carbon.

29. The system of any of examples 21-28, wherein the hydrogen and solid materials in the product stream are separated using a cyclone separator.

30. The system of any of examples 21-29, wherein the hydrogen and solid materials in the product stream are separated using multiple cyclone separators, to divide the solid materials based on particle size and/or density.

31. The system of any of examples 21-30, wherein the solid materials in the product stream are carried away from the reaction vessel by the flow of the gas products.

32. The system of any of examples 21-31, wherein the flow velocity of the product stream is increased by reducing the cross-sectional area of the reaction vessel near the exit, to allow the solid materials in the product stream to be carried away by the gas products.

33. The system of any of examples 21-32, wherein the hydrogen and solid materials in the product stream are separated using a combination of a cyclone separator and membrane separation.

34. The system of any of examples 21-33, wherein the hydrogen and solid materials are separated through controlled precipitation of carbon in the reaction vessel.

35. The system of any of examples 21-34, where solid materials are separated from the reaction vessel using a mechanical skimming device.

36. The system of any of examples 21-35, where solid materials are separated from the reaction vessel using transverse flow of gas.

37. The system of any of examples 21-36, wherein the hydrogen and solid materials in the product stream are separated using an electrostatic separator.

38. The system of any of examples 21-37, wherein the hydrogen and solid materials in the product stream are separated using filtration.

39. The system of any of examples 21-38, wherein the reaction vessel is replaced periodically to remove solid materials.

40. The system of any of examples 21-39, where only a fraction of the gas is converted into hydrogen and carbon.

41. The system of any of examples 21-40, wherein the carbon or other solid materials are disposed on site.

42. The system of any of examples 21-41, wherein the carbon or other solid materials are removed from the system and taken off site.

43. A system which produces hydrogen from natural gas, methane, or other available fuel gas at a scale consistent with residential use, the system comprising: a compact reactor for the conversion of gas into hydrogen and carbon; a separation system for the recovery or disposal of carbon or other solid material from the reactor; and device which utilizes the produced hydrogen to generate electrical power.

44. A system of any of example 43 wherein the hydrogen is converted to electrical power using a thermionic converter, Alkaline Metal Thermal Energy Converter (AMTEC), fuel cell, internal combustion engine, thermoelectric generator, or Stirling engine.

45. The system of any of examples 43-44, wherein the reactor includes a column of molten metal and wherein the metal includes a single chemical element or mixture of chemical elements.

46. The system of any of examples 43-45, wherein the conversion of the gas into hydrogen and carbon is done by passing the gas through a column of molten salt, which includes a single salt or mixture of different salts.

47. The system of any of examples 43-46, wherein the use or storage of hydrogen is integrated into the system.

48. The system of any of examples 43-47, wherein the hydrogen is transported to a location other than the one where it is generated for use or storage.

49. The system of any of examples 43-48, wherein the hydrogen generated is used to heat the vessel in which methane, natural gas, or other fuel gas is converted into hydrogen and carbon 50. The system of any of examples 43-49, wherein the hydrogen and solid materials in the product stream are separated using a cyclone separator.

51. The system of any of examples 43-50, wherein the hydrogen and solid materials in the product stream are separated using multiple cyclone separators, to divide the solid materials based on particle size and/or density.

52. The system of any of examples 43-51, wherein the solid materials in the product stream are carried away from the reaction vessel by the flow of the gas products.

53. The system of any of examples 43-52, wherein the flow velocity of the product stream is increased by reducing the cross-sectional area of the reaction vessel near the exit, to allow the solid materials in the product stream to be carried away by the gas products.

54. The system of any of examples 43-53, wherein the hydrogen and solid materials in the product stream are separated using a combination of a cyclone separator and membrane separation.

55. The system of any of examples 43-54, wherein the hydrogen and solid materials are separated through controlled precipitation of carbon in the reaction vessel.

56. The system of any of examples 43-55, where solid materials are separated from the reaction vessel using a mechanical skimming device.

57. The system of any of examples 43-56, where solid materials are separated from the reaction vessel using transverse flow of gas.

58. The system of any of examples 43-57, wherein the hydrogen and solid materials in the product stream are separated using an electrostatic separator.

59. The system of any of examples 43-58, wherein the hydrogen and solid materials in the product stream are separated using filtration.

60. The system of any of examples 43-59, wherein the reaction vessel is replaced periodically to remove solid materials.

61. The system of any of examples 43-60, where only a fraction of the gas is converted into hydrogen and carbon.

62. The system of any of examples 43-61, wherein the carbon or other solid materials are disposed on site.

63. The system of any of examples 43-62, wherein the carbon or other solid materials are removed from the system and taken off site.

64. A system which produces hydrogen from natural gas, methane, or other available fuel gas at a scale consistent with residential use, the system comprising: a compact reactor for the conversion of gas into hydrogen and carbon; a separation system for the recovery and/or disposal of solid carbon from the reactor; and an appliance which utilizes the produced hydrogen for local water or space heating and the generation of electrical power.

65. The system of example 64 wherein the hydrogen is converted to electrical power using a thermionic converter, fuel cell, internal combustion engine, thermoelectric generator, or Stirling engine.

66. The system of example 65, wherein the heating appliance is chosen from a furnace, boiler, or water heater.

67. The system of any of examples 64-66, wherein the reactor includes a column of molten metal and wherein the metal includes a single chemical element or mixture of chemical elements.

68. The system of any of examples 64-67, wherein the conversion of the gas into hydrogen and carbon is done by passing the gas through a column of molten salt, which includes a single salt or mixture of different salts.

69. The system of any of examples 64-68, wherein the use or storage of hydrogen is integrated into the system.

70. The system of any of examples 64-69, wherein the hydrogen is transported to a location other than the one where it is generated for use or storage.

71. The system of any of examples 64-70, wherein the hydrogen generated is used to heat the vessel in which methane, natural gas, or other fuel gas is converted into hydrogen and carbon.

72. The system of any of examples 64-71, wherein the hydrogen and solid materials in the product stream are separated using a cyclone separator.

73. The system of any of examples 64-72, wherein the hydrogen and solid materials in the product stream are separated using multiple cyclone separators, to divide the solid materials based on particle size and/or density.

74. The system of any of examples 64-73, wherein the solid materials in the product stream are carried away from the reaction vessel by the flow of the gas products.

75. The system of any of examples 64-74, wherein the flow velocity of the product stream is increased by reducing the cross-sectional area of the reaction vessel near the exit, to allow the solid materials in the product stream to be carried away by the gas products.

76. The system of any of examples 64-75, wherein the hydrogen and solid materials in the product stream are separated using a combination of a cyclone separator and membrane separation.

77. The system of any of examples 64-76, wherein the hydrogen and solid materials are separated through controlled precipitation of carbon in the reaction vessel.

78. The system of any of examples 64-77, where solid materials are separated from the reaction vessel using a mechanical skimming device.

79. The system of any of examples 64-78, where solid materials are separated from the reaction vessel using transverse flow of gas.

80. The system of any of examples 64-79, wherein the hydrogen and solid materials in the product stream are separated using an electrostatic separator.

81. The system of any of examples 64-80, wherein the hydrogen and solid materials in the product stream are separated using filtration.

82. The system of any of examples 64-81, wherein the reaction vessel is replaced periodically to remove solid materials.

83. The system of any of examples 64-82, where only a fraction of the gas is converted into hydrogen and carbon.

84. The system of any of examples 64-83, wherein the carbon or other solid materials are disposed on site.

85. The system of any of examples 64-84, wherein the carbon or other solid materials are removed from the system and taken off site.

86. A system which produces hydrogen from natural gas, methane, or other available fuel gas at a scale consistent with residential use, the system comprising: a compact reactor for the conversion of gas into hydrogen and carbon; a separation system for the recovery or disposal of solid carbon or other solid material from the reactor; and a system that stores the produced hydrogen for later use.

87. The system of example 86, wherein the reactor includes a column of molten metal and wherein the metal includes a single chemical element or mixture of chemical elements.

88. The system of any of examples 86-87, wherein the conversion of the gas into hydrogen and carbon is done by passing the gas through a column of molten salt, which includes a single salt or mixture of different salts.

89. The system of any of examples 86-88, wherein the use or storage of hydrogen is integrated into the system.

90. The system of any of examples 86-89, wherein the hydrogen is transported to a location other than the one where it is generated.

91. The system of any of examples 86-90, wherein the hydrogen generated is used to heat the vessel in which methane, natural gas, or other fuel gas is converted into hydrogen and carbon.

92. The system of any of examples 86-91, wherein the hydrogen and solid materials in the product stream are separated using a cyclone separator.

93. The system of any of examples 86-92, wherein the hydrogen and solid materials in the product stream are separated using multiple cyclone separators, to divide the solid materials based on particle size and/or density.

94. The system of any of examples 86-93, wherein the solid materials in the product stream are carried away from the reaction vessel by the flow of the gas products.

95. The system of any of examples 86-94, wherein the flow velocity of the product stream is increased by reducing the cross-sectional area of the reaction vessel near the exit, to allow the solid materials in the product stream to be carried away by the gas products.

96. The system of any of examples 86-95, wherein the hydrogen and solid materials in the product stream are separated using a combination of a cyclone separator and membrane separation.

97. The system of any of examples 86-96, wherein the hydrogen and solid materials are separated through controlled precipitation of carbon in the reaction vessel.

98. The system of any of examples 86-97, where solid materials are separated from the reaction vessel using a mechanical skimming device.

99. The system of any of examples 86-98, where solid materials are separated from the reaction vessel using transverse flow of gas.

100. The system of any of examples 86-99, wherein the hydrogen and solid materials in the product stream are separated using an electrostatic separator.

101. The system of any of examples 86-100, wherein the hydrogen and solid materials in the product stream are separated using filtration.

102. The system of any of examples 86-101, wherein the reaction vessel is replaced periodically to remove solid materials.

103. The system of any of examples 86-101, where only a fraction of the gas is converted into hydrogen and carbon.

104. The system of any of examples 86-103, wherein the carbon or other solid materials are disposed on site.

105. The system of any of examples 86-104, wherein the carbon or other solid materials are removed from the system and taken off site.

106. A system for producing hydrogen gas for local distribution, consumption, and/or storage, the system comprising:
   a pyrolysis reactor coupleable to a supply of reaction material that includes a hydrocarbon, wherein the pyrolysis reactor includes one or more flow channels positioned to transfer heat to the reaction material to convert the hydrocarbon into an output that includes hydrogen gas, carbon particulates, and heat, and wherein the pyrolysis reactor is sized to receive the reaction material at a rate between 1,000 and 40,000 standard cubic centimeters per minute;
   a carbon separation system operably coupled to the pyrolysis reactor to separate the hydrogen gas the carbon particulates in the output; and
   a power generation component locally coupleable to the pyrolysis reactor to receive at least a portion of the output and convert the output into electrical power.

107. The system of example 106, further comprising a heating component and/or a cooling component, wherein the heating component and/or the cooling component is operably coupled to the pyrolysis reactor and/or the power generation component to receive heat and/or a portion of the electrical power.

108. The system of any of examples 106 and 107 wherein the power generation component includes at least one of: a thermionic converter, an alkali metal thermal to electric converter, a thermophotovoltaic converter, a thermoelectric converter, a gas turbine, a fuel cell, a microturbine, an internal combustion engine, a steam turbine, or a Stirling engine.

109. The system of any of examples 106-108, further comprising a burner operably coupled to the pyrolysis reactor through one or more flow pathways to receive and burn at least a portion of the output, and a thermal communication path coupled between the burner and the pyrolysis reactor and positioned to direct heat from the burner to the pyrolysis reactor.

110. The system of any of examples 106-109, further comprising a heating component in thermal communication with the pyrolysis reactor, the heating component including at least one of: a furnace, a forced air distribution system, a boiler, a radiator distribution system, a heat pump, a hybrid heating system, or a hydronic heating system.

111. The system of any of examples 106-110, further comprising a cooling component operably coupled to the pyrolysis reactor and/or the power generation component, the cooling component including at least one of: an absorption chiller, a compression air conditioner, or a heat pump.

112. The system of any of examples 106-11 wherein the reaction material includes a hydrocarbon gas, and wherein the pyrolysis reactor includes:
  at least one vertical column of molten salt having a lower end and an upper end;
  an input valve positioned toward the lower end and in fluid communication with the input supply; and
  an output valve positioned toward the upper end.

113. The system of example 112 wherein the pyrolysis reactor further includes an electric heating coil thermally coupled to the at least one vertical column.

114. The system of any of examples 112 and 113 wherein at least a portion of the carbon separation system is integrated with the at least one vertical column of the pyrolysis reactor.

115. The system of any of examples 112-114 wherein the at least one vertical column of molten salt includes two or more vertical columns of molten salt, and wherein the pyrolysis reactor includes one or more valves positioned to control a supply of the reaction material to each of the vertical columns independently according to a target output from the pyrolysis reactor.

116. The system of any of examples 106-111 wherein the output is a first output, wherein the pyrolysis reactor includes a first reaction chamber, a second reaction chamber, one or more burners, and one or more valves operably coupled to the input supply, the first reaction chamber, the second reaction chamber, and the one or more burners, and wherein:
  in a first configuration, the one or more valves:
    establish fluid communication between the input supply and the first reaction chamber, wherein the first reaction chamber converts at least a first portion of the hydrocarbon in the reaction material into the first output;
    establish fluid communication between the first reaction chamber and the one or more burners, wherein the one or more burners combust at least part of the hydrogen gas in the first output to generate a second output that includes hot flue gas; and
    establish fluid communication between the one or more burners and the second reaction chamber, wherein the second reaction chamber receives at least part of the second output to absorb heat from the hot flue gas of the second output, and wherein the absorbed heat is at least partially stored in the second reaction chamber; and
  in a second configuration, the one or more valves:
    establish fluid communication between the input supply and the second reaction chamber, wherein the second reaction chamber converts at least a second portion of the hydrocarbon in the reaction material into a third output that includes hydrogen gas, carbon particulates, and heat;
    establish fluid communication between the second reaction chamber and the one or more burners, wherein the one or more burners combust at least part of the hydrogen gas in the third output to generate a fourth output that includes hot flue gas; and
    establish fluid communication between the one or more burners and the first reaction chamber, wherein the first reaction chamber receives at least part of the fourth output to absorb heat from the hot flue gas of the fourth output, and wherein the absorbed heat is at least partially stored in the first reaction chamber.

117. The system of example 116, further comprising a controller communicably coupled to the valves and storing instructions that when executed cause the controller to:
  at a first time, position the one or more valves in the first configuration;
  at a second time, position the one or more valves in the second configuration; and
  at a third time, reposition the one or more valves in the first configuration.

118. The system of example 117, further comprising one or more temperature sensors operably coupled to the controller and positioned to measure a first temperature of the first reaction chamber and a second temperature of the second reaction chamber, wherein the instructions, when executed, further cause the controller to position the one or more valves in the second configuration when the first temperature of the first reaction chamber falls below a predetermined threshold.

119. The system of example 117, further comprising one or more pressure sensors operably coupled to the controller and positioned to measure a first pressure drop across the first reaction chamber and a first pressure drop across the second reaction chamber, wherein the instructions, when executed, further cause the controller to position the one or more valves in the second configuration when the first pressure drop across the first reaction chamber reaches a predetermined threshold.

120. The system of any of examples 116-119 wherein each of the first and second reaction chambers include a plurality of flow channels extending along a corresponding longitudinal axis and wherein a cross-section of the first and second reaction chambers transverse to the corresponding axis has a channel density of between 1 and 10 channels per square inch.

121. The system of any of examples 116-120 wherein at least a portion of the carbon separation system is integrated with the pyrolysis reactor between the first reaction chamber and the second reaction chamber.

122. The system of any of examples 116-121 wherein the one or more valves divert at least a portion of the hydrogen gas in the first output away from the pyrolysis reactor along a flow path before the first output is combusted.

123. The system of any of examples 116-122, further comprising at least a third reaction chamber operably coupled to the one or more valves to receive at least one of the reaction material and the second output.

124. The system of any of examples 106-123 wherein the pyrolysis reactor is a first pyrolysis reactor, and wherein the system further comprises a second pyrolysis reactor coupleable to the supply of reaction material that includes the hydrocarbon.

125. A method for generating hydrogen gas for local distribution, consumption, and/or storage, the method comprising:
  receiving, at a pyrolysis reactor, a fuel gas having a hydrocarbon at a flow rate of from 500 to 1,000,000 standard cubic centimeters per minute;
  heating the fuel gas within the pyrolysis reactor to a reaction temperature, wherein, at the reaction temperature, at least a portion of the hydrocarbon in the fuel gas converts into hydrogen gas and carbon particulates;
  separating and capturing the hydrogen gas and carbon particulates; and
  converting at least a portion of the captured hydrogen gas into electricity using a power generation component, wherein the power generation component is locally coupled to the pyrolysis reactor.

126. The method of example 125, further comprising combusting at least a portion of the captured hydrogen gas to heat to the pyrolysis reactor.

127. The method of any of examples 125 and 126 wherein the power generation component includes at least one of: a thermionic converter, an alkali metal thermal to electric converter, a thermophotovoltaic converter, a thermoelectric converter, a turbine, a fuel cell, a microturbine, an internal combustion engine, a steam turbine, or a Stirling engine.

128. The method of any of examples 125-127 wherein heating the fuel gas within the pyrolysis reactor includes passing the reaction material through a chamber of molten fluid.

129. The method of any of examples 125-127 wherein the heating the fuel gas within the pyrolysis reactor includes passing the fuel gas through a preheated first reaction chamber, and wherein the method further comprises combusting at least a portion of the captured hydrogen gas to heat a second reaction chamber.

130. The method of example 129, further comprising, after passing the fuel gas through the preheated first reaction chamber for a period of time, passing the fuel gas through the second reaction chamber, wherein combusting the at least a portion of the captured hydrogen gas heats the first reaction chamber.

131. The method of any of examples 125-130, further comprising using (a) at least a portion of the captured hydrogen gas and/or (b) the generated electricity, at (i) a heating component and/or (ii) a cooling component.

132. The method of any of examples 125-131, further comprising combusting at least a portion of the captured hydrogen gas within a heating component, the heating component including at least one of: a furnace, a forced air distribution system, a boiler, a radiator distribution system, a heat pump, a hybrid heating system, or a hydronic heating system.

133. The method of any of examples 125-132, further comprising using at least a portion of the generated electricity within a cooling component, the cooling component including at least one of: an absorption chiller, a compression air conditioner, or a heat pump.

CONCLUSION

Embodiments of the present disclosure may be implemented as computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. The terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, ASICs, programming logic devices (PLDs), or the like, or a combination of such devices. Computer-executable instructions may be stored in memory, such as RAM, ROM, flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated here by reference conflict with the present disclosure, the present disclosure controls.

We claim:

1. A system for producing hydrogen gas for local distribution, consumption, and/or storage, the system comprising:
   a pyrolysis reactor coupleable to a supply of reaction material that includes a hydrocarbon, wherein the pyrolysis reactor includes one or more flow channels positioned to transfer heat to the reaction material to convert the hydrocarbon into an output that includes hydrogen gas, carbon particulates, and heat, and wherein the pyrolysis reactor is sized to receive the reaction material at a rate between 500 and 3,750,000 standard cubic centimeters per minute;
   a carbon separation system operably coupled to the pyrolysis reactor to separate the hydrogen gas from the carbon particulates in the output; and
   a power generation component locally coupleable to the pyrolysis reactor to receive at least a portion of the output and convert the output into electrical power.

2. The system of claim 1, further comprising a heating component and/or a cooling component, wherein the heating component and/or the cooling component is operably coupled to the pyrolysis reactor and/or the power generation component to receive heat and/or a portion of the electrical power.

3. The system of claim 1 wherein the power generation component includes at least one of: a thermionic converter, an alkali metal thermal to electric converter, a thermophotovoltaic converter, a thermoelectric converter, a turbine, a fuel cell, a microturbine, an internal combustion engine, a steam turbine, or a Stirling engine.

4. The system of claim 1, further comprising a burner operably coupled to the pyrolysis reactor through one or more flow pathways to receive and burn at least a portion of the output, and a thermal communication path coupled between the burner and the pyrolysis reactor and positioned to direct heat from the burner to the pyrolysis reactor.

5. The system of claim 1, further comprising a heating component in thermal communication with the pyrolysis reactor, the heating component including at least one of: a furnace, a forced air distribution system, a boiler, a radiator distribution system, a heat pump, a hybrid heating system, or a hydronic heating system.

6. The system of claim 1, further comprising a cooling component operably coupled to the pyrolysis reactor and/or the power generation component, the cooling component including at least one of: an absorption chiller, a compression air conditioner, or a heat pump.

7. The system of claim 1, wherein the reaction material includes a hydrocarbon gas, and wherein the pyrolysis reactor includes:
at least one vertical column of molten salt having a lower end and an upper end;
an input valve positioned toward the lower end and in fluid communication with the supply; and
an output valve positioned toward the upper end.

8. The system of claim 7, wherein the pyrolysis reactor further includes an electric heating coil thermally coupled to the at least one vertical column.

9. The system of claim 7, wherein at least a portion of the carbon separation system is integrated with the at least one vertical column of the pyrolysis reactor.

10. The system of claim 7, wherein the at least one vertical column of molten salt includes two or more vertical columns of molten salt, and wherein the pyrolysis reactor includes one or more valves positioned to control a supply of the reaction material to each of the vertical columns independently according to a target output from the pyrolysis reactor.

11. The system of claim 1, wherein the output is a first output, wherein the pyrolysis reactor includes a first reaction chamber, a second reaction chamber, one or more burners, and one or more valves operably coupled to (1) the supply, (2) the first reaction chamber, (3) the second reaction chamber, and (4) the one or more burners, and wherein:
in a first configuration, the one or more valves:
establish fluid communication between the supply and the first reaction chamber, wherein the first reaction chamber converts at least a first portion of the hydrocarbon in the reaction material into the first output;
establish fluid communication between the first reaction chamber and the one or more burners, wherein the one or more burners combust at least part of the hydrogen gas in the first output to generate a second output that includes hot flue gas; and
establish fluid communication between the one or more burners and the second reaction chamber, wherein the second reaction chamber receives at least part of the second output to absorb heat from the hot flue gas of the second output, and wherein the absorbed heat is at least partially stored in the second reaction chamber; and
in a second configuration, the one or more valves:
establish fluid communication between the and the second reaction chamber, wherein the second reaction chamber converts at least a second portion of the hydrocarbon in the reaction material into a third output that includes hydrogen gas, carbon particulates, and heat;
establish fluid communication between the second reaction chamber and the one or more burners, wherein the one or more burners combust at least part of the hydrogen gas in the third output to generate a fourth output that includes hot flue gas; and
establish fluid communication between the one or more burners and the first reaction chamber, wherein the first reaction chamber receives at least part of the fourth output to absorb heat from the hot flue gas of the fourth output, and wherein the absorbed heat is at least partially stored in the first reaction chamber.

12. The system of claim 11, further comprising a controller communicably coupled to the valves and storing instructions that when executed cause the controller to:
at a first time, position the one or more valves in the first configuration;
at a second time, position the one or more valves in the second configuration; and
at a third time, reposition the one or more valves in the first configuration.

13. The system of claim 12, further comprising one or more temperature sensors operably coupled to the controller and positioned to measure a first temperature of the first reaction chamber and a second temperature of the second reaction chamber, wherein the instructions, when executed, further cause the controller to position the one or more valves in the second configuration when the first temperature of the first reaction chamber falls below a predetermined threshold.

14. The system of claim 12, further comprising one or more pressure sensors operably coupled to the controller and positioned to measure a first pressure drop across the first reaction chamber and a first pressure drop across the second reaction chamber, wherein the instructions, when executed, further cause the controller to position the one or more valves in the second configuration when the first pressure drop across the first reaction chamber reaches a predetermined threshold.

15. The system of claim 11, wherein each of the first and second reaction chambers include a plurality of flow channels extending along a corresponding longitudinal axis and wherein a cross-section of the first and second reaction chambers transverse to the corresponding axis has a channel density of between 1 and 10 channels per square inch.

16. The system of claim 11, wherein at least a portion of the carbon separation system is integrated with the pyrolysis reactor between the first reaction chamber and the second reaction chamber.

17. The system of claim 11 wherein the one or more valves divert at least a portion of the hydrogen gas in the first output away from the pyrolysis reactor along a flow path before the first output is combusted.

18. The system of claim 11, further comprising at least a third reaction chamber operably coupled to the one or more valves to receive at least one of the reaction material and the second output.

19. The system of claim 1. wherein the pyrolysis reactor is a first pyrolysis reactor, and wherein the system further comprises a second pyrolysis reactor coupleable to the supply of reaction material that includes the hydrocarbon.

20. The system of claim 1, wherein the pyrolysis reactor is sized to produce hydrogen for consumption in a residential building and/or a commercial building.

21. The system of claim 1, wherein the pyrolysis reactor is not an industrial-scale reactor.

22. The system of claim 1, wherein the flow channels of the reactor are positioned in a core region of the reactor, and wherein the system further comprises a burner positioned to direct a flue gas through at least a portion of the core region.

23. The system of claim 1, wherein the reactor is configured to be retrofitted with a heating unit and sized to fit within a footprint of the heating unit.

24. The system of claim 23, wherein the reactor is thermally coupled to the heating unit to capture parasitic heat loss from the reactor in the heating unit.

25. A system for producing hydrogen gas for local distribution, consumption, and/or storage, the system comprising:
   a pyrolysis reactor coupleable to a supply of reaction material that includes a hydrocarbon, wherein the pyrolysis reactor comprises one or more flow channels positioned to transfer heat to the reaction material to convert the hydrocarbon into an output that includes hydrogen gas, carbon particulates, and heat, and wherein the pyrolysis reactor is sized to consume the reaction material at a consumption rate between 10 and 3,350,000 million British thermal units per year;
   a carbon separation system operably coupled to the pyrolysis reactor to separate the hydrogen gas from the carbon particulates in the output; and
   a burner locally coupleable to the pyrolysis reactor to receive and combust at least a portion of the output.

26. The system of claim 25, wherein the one or more flow channels are positioned in a main body of the pyrolysis reactor, wherein the pyrolysis reactor further comprises a chamber at least partially surrounding the main body and one or more electrical heaters positioned within the chamber to deliver heat around the main body, and wherein the chamber and the one or more electrical heaters are configured to reduce parasitic heat loss from the main body.

27. The system of claim 25, wherein the hydrocarbon is a gas, and wherein the pyrolysis reactor includes:
   at least one vertical column of molten salt having a lower end and an upper end;
   an input valve positioned toward the lower end and in fluid communication with the supply; and
   an output valve positioned toward the upper end.

28. The system of claim 25, wherein the output is a first output, wherein the pyrolysis reactor includes a first reaction chamber, a second reaction chamber, one or more pyrolysis burners, and one or more valves operably coupled to (1) the supply, (2) the first reaction chamber, (3) the second reaction chamber, and (4) the one or more pyrolysis burners, and wherein:
   in a first configuration, the one or more valves:
      direct the reaction material from the supply to the first reaction chamber, wherein the first reaction chamber converts at least a first portion of the hydrocarbon in the reaction material into the first output;
      direct at least part of the hydrogen gas in the first output to the one or more burners, wherein the one or more burners combust the hydrogen gas to generate a second output that includes hot flue gas; and
      direct the second output to the second reaction chamber, wherein the second reaction chamber absorbs and at least partially stores heat from the hot flue gas of the second output; and
   in a second configuration, the one or more valves:
      direct the reaction material from the supply to the second reaction chamber, wherein the second reaction chamber converts at least a second portion of the hydrocarbon in the reaction material into a third output that includes hydrogen gas;
      direct at least part of the hydrogen gas in the third output to the one or more burners, wherein the one or more burners combust the hydrogen gas to generate a fourth output that includes hot flue gas; and
      direct the second output to the first reaction chamber, wherein the first reaction chamber receives and absorbs heat from the hot flue gas of the fourth output.

* * * * *

UNITED STATES PATENT AND TRADEMARK OFFICE
CERTIFICATE OF CORRECTION

| | |
|---|---|
| PATENT NO. | : 11,897,768 B2 |
| APPLICATION NO. | : 17/337326 |
| DATED | : February 13, 2024 |
| INVENTOR(S) | : Justin B. Ashton et al. |

It is certified that error appears in the above-identified patent and that said Letters Patent is hereby corrected as shown below:

In the Specification

In Column 31, Line 30, delete "carbon" and insert -- carbon. --.

In the Claims

In Column 39, Line 5, in Claim 3, delete "claim 1" and insert -- claim 1, --.

In Column 40, Line 7, in Claim 11, delete "the" and insert -- the supply --.

In Column 40, Line 64, in Claim 17, delete "claim 11" and insert -- claim 11, --.

In Column 41, Line 5, in Claim 19, delete "claim 1." and insert -- claim 1, --.

Signed and Sealed this
Thirtieth Day of April, 2024

Katherine Kelly Vidal
*Director of the United States Patent and Trademark Office*